United States Patent
Sugita et al.

(10) Patent No.: US 6,377,754 B1
(45) Date of Patent: Apr. 23, 2002

(54) DRIVING FORCE TRANSMISSION SWITCHING APPARATUS

(75) Inventors: Yukihiko Sugita, Kokubunji; Naohiro Tsuchida, Hachioji; Masatoshi Sato, Hino, all of (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/364,498

(22) Filed: Jul. 30, 1999

(30) Foreign Application Priority Data

Jul. 31, 1998 (JP) .......................................... 10-217872
Nov. 19, 1998 (JP) .......................................... 10-329970
Jul. 9, 1999 (JP) .......................................... 11-196218

(51) Int. Cl.$^7$ .............................. G03B 3/10; G03B 1/00
(52) U.S. Cl. ........................ 396/132; 396/411; 396/418
(58) Field of Search ................................ 396/132, 411, 396/418

(56) References Cited

U.S. PATENT DOCUMENTS

| | | | | |
|---|---|---|---|---|
| 4,299,316 A | | 11/1981 | Reinmoeller | 192/48.8 |
| 5,168,295 A | | 12/1992 | Yoshihara et al. | 354/173.1 |
| 5,365,301 A | | 11/1994 | Sugita et al. | 354/400 |
| 5,610,677 A | * | 3/1997 | Katagiri | 396/418 |
| 5,701,531 A | * | 12/1997 | Tanaka et al. | 396/418 |
| 5,721,996 A | | 2/1998 | Okumura et al. | 396/387 |
| 6,215,958 B1 | * | 4/2001 | Ichino et al. | 396/418 |

FOREIGN PATENT DOCUMENTS

JP 61-184247 8/1986

* cited by examiner

Primary Examiner—David M. Gray
(74) Attorney, Agent, or Firm—Ostrolenk, Faber, Gerb & Soffen, LLP

(57) ABSTRACT

A driving force transmission switching apparatus for a camera in accordance with the present invention includes: a drive source that generates a driving force; a worm gear that receives the driving force to rotate; a driving force transmission gear device that includes a driving gear and meshes the driving gear with the worm gear to move the driving gear in parallel to an axial direction of the worm gear as the worm gear rotates so as to shift the driving gear to a plurality of transmission positions for applying a driving force of the drive source and a non-transmission position for not applying the driving force of the drive source; a plurality of driven gears which are disposed in positions for meshing with the driving gear, respectively corresponding to the plural transmission positions where the driving gear is to be set, and which receive a driving force of the drive source via the driving gear; and a position control device for conducting control by meshing the driving force transmission gear device with the worm gear to move the driving force transmission gear device in parallel to an axial direction of the worm gear as the worm gear rotates so as to shift the driving force transmission gear device to a plurality of transmission positions for applying the driving force of the drive source and a non-transmission position for not applying the driving force of the drive source.

45 Claims, 26 Drawing Sheets

DRIVING FORCE TRANSMISSION SWITCHING APPARATUS

BACKGROUND OF THE INVENTION

1. Field of the Invention

The present invention relates to a driving force transmission switching apparatus and, more particularly, to a driving force transmission switching apparatus for switching among objects to which a driving force is transmitted.

2. Description of the Related Art

In recent years, cameras have been equipped with a variety of driven devices such as film feeding devices, lens moving devices, or the like. There have been various attempts to drive these diverse driven devices with a single drive source, e.g., a single motor, in order to meet a demand for reduced sizes, lower cost, etc. For instance, Japanese Unexamined Patent Publication No. 5-321986 discloses a driving force transmission switching system equipped with a single motor and designed to drive a plurality of driven devices as mentioned above by appropriately switching among driven devices to which the driving force of the motor is transmitted, by using a planetary gear assembly. More specifically, the driving force transmission switching system revolves a planetary gear by running the motor in one direction to select a driven gear associated with a device to be driven. After selecting the driven gear, the motor is run in the other direction to transmit a driving force to the driven device via the driven gear.

However, the driving force switching system proposed in Japanese Unexamined Patent Publication No. 5-321986 requires a space for the planetary gear to revolve. Furthermore, if there are a plurality of devices to be driven and are located away from each other, then many gears are required, thus involving a large wasteful space.

Japanese Unexamined Patent Publication No. 5-257195 discloses a driving force transmission switching apparatus provided with two driven assemblies, wherein, while one of them is being driven, the other remains locked. This, only satisfies an application wherein driven assemblies have only two states and has been inapplicable to a driving force transmission switching apparatus equipped with three or more driven assemblies.

None of the aforementioned, taken alone or in combination, teach or suggest the present invention.

SUMMARY OF THE INVENTION

A first object of the present invention is to provide a driving force transmission switching apparatus that is small and yet capable of switching among a plurality of objects to which a driving force is transmitted.

A second object of the present invention is to provide a driving force transmission switching apparatus capable of reliably retaining a driven assembly in a halted state even when not in engagement with a driving assembly.

To these ends, according to the present invention, there is provided a driving force transmission switching apparatus for a camera, which is equipped with:

- a drive source that generates a driving force;
- a worm gear that receives the driving force to rotate;
- a driving force transmission gear device that includes a driving gear and meshes the driving gear with the worm gear to move the driving gear parallel with an axial direction of the worm gear as the worm gear rotates so as to shift the driving gear to a plurality of transmission positions far applying a driving force of the drive source and a non-transmission position when not applying the driving force of the drive source;
- a plurality of driven gears which are disposed in positions for meshing with the driving gear, respectively corresponding to the plurality of transmission positions where the driving gear is positioned, and which receive a driving force of the drive source via the driving gear; and
- a position control device for meshing the driving force transmission gear device with the worm gear to move the driving force transmission gear device parallel with the axial direction of the worm gear as the worm gear rotates so as to shift the driving force transmission gear device to the plurality of transmission positions for applying a driving force of the drive source and a non-transmission position when not applying the driving force of the drive source.

These objects and advantages of the present invention will become further apparent from the following detailed explanation.

BRIEF DESCRIPTION OF THE DRAWINGS

The invention is described in detail below with reference to the following figures, throughout which similar reference characters denote corresponding features.

DETAILED DESCRIPTION OF THE PREFERRED EMBODIMENTS

Embodiments of the present invention will now be described in conjunction with the accompanying drawings.

Figure 1:
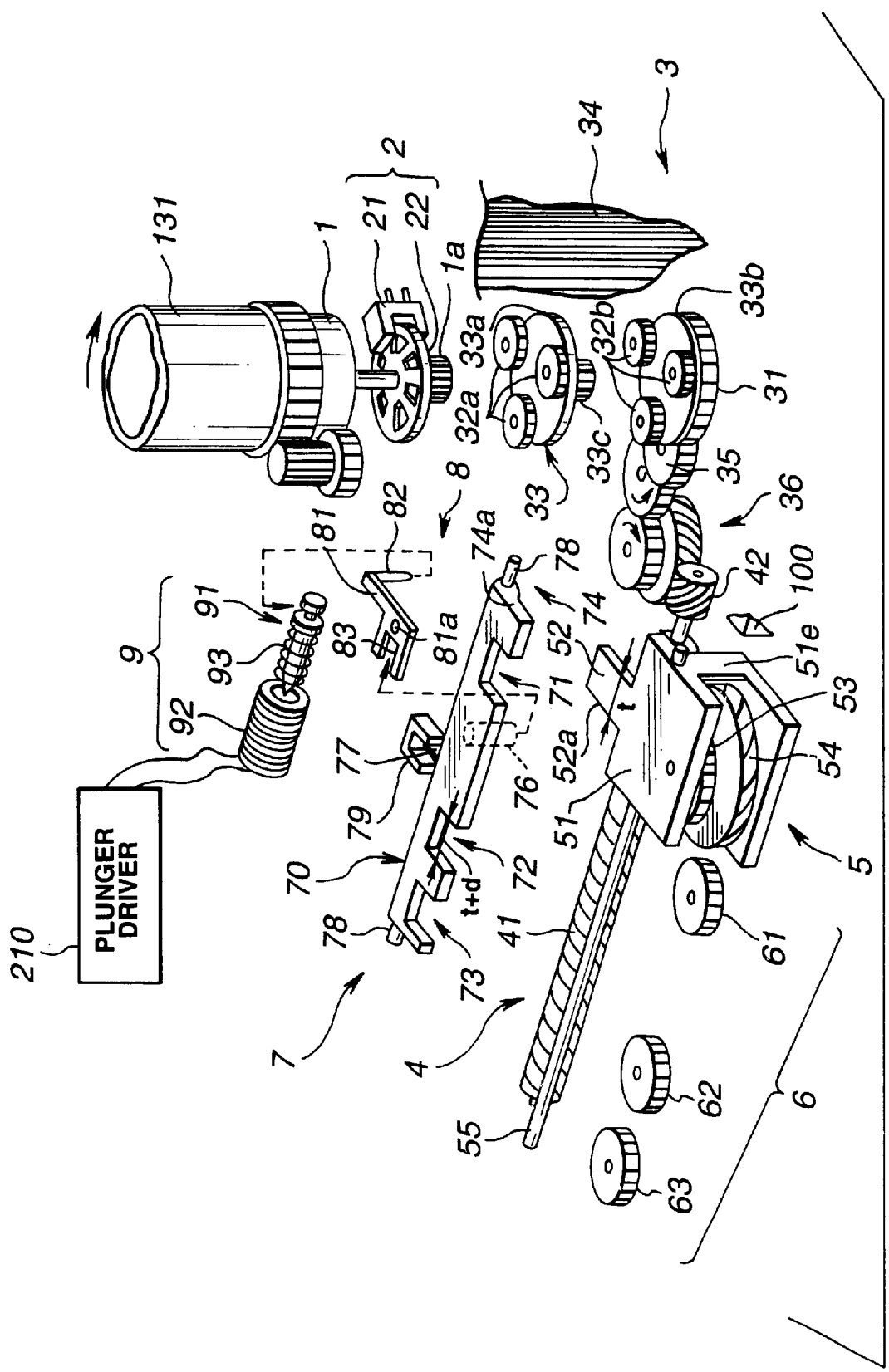
FIG. 1 is a perspective exploded view of a driving force transmission switching apparatus of a first embodiment in accordance with the present invention.

FIG. 1 is an exploded perspective view of a driving force transmission switching apparatus of a first embodiment in accordance with the present invention. For the purpose of explanation, the components of the driving force transmission switching apparatus are shown in a disassembled state as illustrated although the actual dispositions of the components are not necessarily as shown in the drawing. The driving force transmission switching apparatus of the embodiment is formed of many components, the functions of which will be described.

Referring to FIG. 1, the driving force transmission switching apparatus is equipped with: a motor 1 acting as a drive source of driven devices provided in a camera to which the driving force transmission switching apparatus is applied; a motor rotational amount detecting device 2 for detecting a rotational amount of the motor 1; a driving force transmission device 3 that transmits a driving force of the motor 1 to a worm gear device 4, which will be discussed hereinafter; the worm gear device 4 that engages the driving force transmission device 3 and rotates by the driving force of the motor 1; a driving force transmission gear device 5 which engages the worm gear device 4 and may be set in a plurality of positions as the worm gear device 4 rotates; a plurality of driven gears 6 that are disposed in positions, where they can engage the driving force transmission device 5, in association with the foregoing plural positions so as to transmit the driving force of the motor 1 to a predetermined driven system; a driving force transmission gear position setting device 7 for setting the position of the driving force transmission gear device 5; a switching member 8 for shifting the driving force transmission gear position setting device 7; and a plunger device 9 for shifting the switching member 8.

The functions of the above elements will now be described.

The motor 1 that can be rotated in both forward and reverse directions is provided in a film take-up spool 131 that is a hollow cylinder. A pinion gear 1a is provided on an output shaft of the motor 1. The motor 1 serves as a drive source of the driven devices provided in the camera to which the driving force transmission switching apparatus is applied.

The motor rotational amount detecting device 2 is an encoder for detecting the rotational amount of the motor 1. It is a known detecting device which is provided integrally with the output shaft of the motor 1, and composed of a disc 22 with openings formed along its periphery, and a photo interrupter 21.

The driving force transmission device 3 is formed of: a speed reducer 33 engaging the pinion gear la of the motor 1; a sun gear 31 acting as an output gear of the speed reducer 33; a carrier drive gear 35 engaging the sun gear 31; a carrier drive gear train 36 engaging the carrier drive gear 35 to transmit a driving force to the worm gear device 4; and internal gear 34 that engages planetary gears 32a and 32b in the speed reducer 33, fully surrounding the revolution circumferences of the foregoing planetary gears.

The speed reducer 33 is a known speed reducer formed of: a first planetary gear group composed of three planetary gears 32a that are provided on one surface of a first disc 33a, and rotate and revolve, meshing with the motor pinion gear 1a; a gear 33c coaxially provided on the other surface of the first disc 33a; a second planetary gear group composed of three planetary gears 32b that are provided on one surface of a second disc 33b, and rotate and revolve, meshing with the gear 33c; and the internal gear 34 that meshes with and surrounds these groups of planetary gears 32a and 32b.

The sun gear 31 is provided integrally with the disc 33b on the other surface of the second disc 33b, and it rotates in either the forward or reverse direction according to the revolution of the motor 1. The sun gear 31 rotates via the speed reducer 33 so that it rotates at a number of revolutions less than that of the motor 1.

A carrier driving gear 35 acting as part of a drive system of a carrier 51, which will be discussed hereinafter, in a driving force transmission gear device 5 always is engaged with the sun gear 31. Furthermore, a second worm gear 42 of a worm gear device 4 engages the carrier driving gear 35 via a gear train 36.

A driving force transmission rotary carrier (not shown) for transmitting a driving force to a film cartridge spool drive system and a film take-up spool drive system is provided on the other surface of the sun gear 31. Thus, the sun gear 31 serves to transmit a driving force to the driving force transmission gear device 5 (the carrier driving system) and also to transmit a driving force to the film cartridge spool drive system and the film take-up spool drive system.

The worm gear device 4 is formed of the second worm gear 42 that engages the carrier driving gear train 36, which Is an end of a driving force transmission device 3, and a first worm gear 41 that is provided coaxially with the second worm gear 42 and engages the driving force transmission gear device 5. This means that the first worm gear 41 is rotated by a driving force of the motor 1 supplied via the driving force transmission device 3 (the speed reducer 33, the sun gear 31, the carrier driving gear 35, and the carrier driving gear train 36), and the first worm gear 41 transmits the driving force to the driving force transmission gear device 5. In other words, the first worm gear 41 rotates whenever the motor 1 rotates.

The driving force transmission gear device 5 includes a helical gear 54 that meshes with the first worm gear 41, a spur gear 53 formed coaxially and integrally with the helical gear 54 on one surface of the helical gear 54, a guide rod 55 provided in parallel to an axial direction of the first worm gear 41, and a carrier 51 that rotatingly maintains a driving force transmission gear formed of the helical gear 54 and the spur gear 53, and moves in parallel to the axial direction of the first worm gear 41 guided by the guide rod 55.

Figure 2:
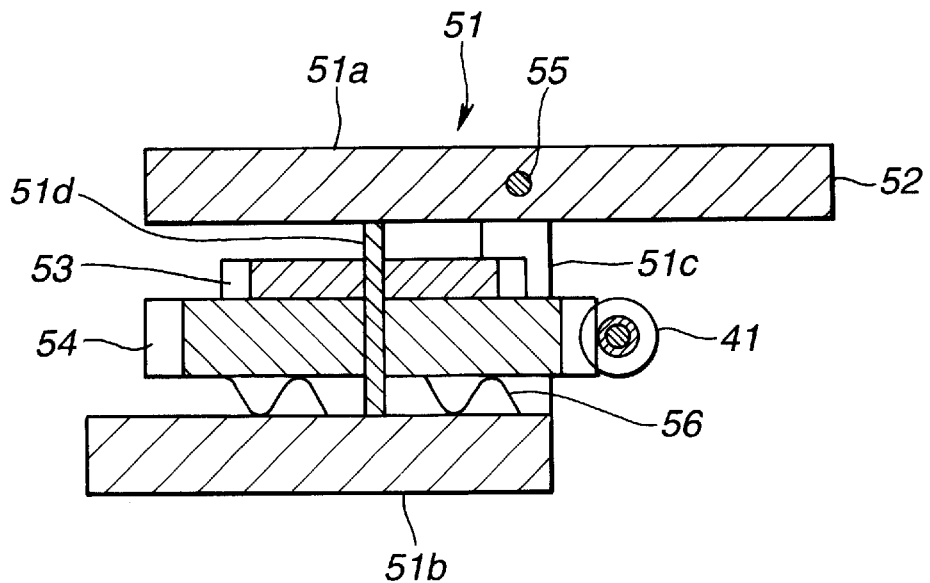
FIG. 2 is a sectional view illustrating a configuration of a driving force transmission gear device in the driving force transmission switching apparatus of the first embodiment.

The carrier 51 includes a first plate 51a and a second plate 51b which oppose each other, coupled by a pillar 51c at both ends thereof as shown in FIG. 2. A shaft 51d couples the appropriate centers of the opposing surfaces of the two plates, the shaft 51d rotatably supporting the driving force transmission gear composed of the spur gear 53 and the helical gear 54. A friction device 56 provides fiction between the helical gear 54 and the second plate sib. The friction device 56 causes friction that permits the moving force of the helical gear 54 to be transmitted to the carrier 51 without interfering with the rotation of the helical gear 54.

A position setting portion 52 that engages a driving force transmission gear position setting device 7 extends from one end of the first plate 51a. The position setting portion 52 has a rectangular shape having a width t in an axial direction of the first worm gear 41. The position setting portion 52 engages a plurality of position setting portions formed on the driving force transmission gear position setting unit 7, which will be discussed in detail hereinafter.

The driving force transmission gear formed of the spur gear 53 and the helical gear 54 rotates as the first worm gear 41 rotates by the helical gear 54 engaging the first worm gear 41. As the first worm gear 41 rotates, the helical gear 54 generates a thrust or moving force in parallel to an axial direction of the first worm gear 41.

As set forth above, in this embodiment, the friction device 56 provided between the helical gear 54 and the carrier 51 (the second plate sib) transmits the thrust of the helical gear 54, which is generated by the rotation of the first worm gear 41, to the carrier 51. The transmitted force causes the carrier 51 together with the helical gear 54 and the spur gear 53 to move in parallel with the axial direction of the first worm gear 41 guided by the guide rod 55.

Thus, the carrier 51 that includes the spur gear 53 and the helical gear 54 is driven in parallel with the axial direction of the first worm gear 41 by the driving force of the motor 1. This embodiment is characterized in that the carrier 51 is set in a plurality of specified positions by the driving force transmission gear position setting device 7 and the plural driven gears 6. This will be described in more detail hereinafter.

The driven gear assembly 6 includes three driven gears 61, 62, and 63 in the present embodiment. These driven gears constitute a part of the driving system of the driven device as shown below:

1st driven gear 61: Performs zooming in/out operation.

2nd driven gear 62: Sets up a lens barrel.

3rd driven gear 63: Opens/closes film cartridge light-shielding door.

The first driven gear 61, the second driven gear 62, and the third driven gear 63 are disposed in order in parallel with the axial direction of the first worm gear 41 so that they are keyed to the respective set positions which will be discussed hereinafter.

The driving force transmission switching apparatus of the embodiment has the following four set positions where the carrier 51 is to be set in association with the driven gear assembly 6 composed of the plural different driven gears. More specifically, the carrier 51 is set in any of the following four positions:

1st position: The spur gear 53 engages the 1st driven gear 61.

2nd position: The spur gear 53 engages the 2nd driven gear 62.

3rd position: The spur gear 53 engages the 3rd driven gear 63.

4th position: Home position or initial position where the spur gear 53 engages none of the above driven gears.

Among the positions shown above, the fourth position, i.e., the home position or the initial position, is the closest to the driving force transmission device 3, with the first position, the second position, and the third position being progressively farther from the fourth position in this order.

Among the above positions, if the first through third positions are defined as the positions- for transmitting the driving force of the motor 1, and the fourth is defined as the position for transmitting no driving force to any of the driven gears 6, then it may be described that the driving force transmission gear device 5 engages the worm gear device 4 and moves in parallel to the axial direction of the worm gear as the worm gear rotates so that it is set at one of the positions for transmitting the driving force of the motor 1 or at the position for not transmitting the driving force of the motor 1. Likewise, the driven gears of the driven gear assembly 6 may be described as driven gears that are provided in the positions where they engage the driving force transmission gear device 5 when the driving force transmission gear device 5 is set at the driving force transmitting positions, thereby receiving the driving force of the motor 1 via the driving force transmission gear device 5.

The set positions of the driving force transmission gear device 5 (the carrier 51) are defined by the driving force transmission gear position setting device 7 as described below.

The driving force transmission gear position setting device 7 has a roughly comb-shaped switching lock main body 70 rotatably supported by a shaft 78 provided parallel with the axis of the first worm gear 41. The switching lock main body 70 has a plurality of position setting portions, namely, first through fourth position setting portions 71 through 74, that are formed on a side opposing the carrier 51. The first through fourth position setting portions 71, 72, 73, and 74 correspond to the foregoing first position, second position, third position, and fourth (home) position, respectively; they engage the rectangular position setting portion 52 extending from the first plate 51a of the carrier S1.

More specifically, in the switching lock main body 70, the first position setting portion 71, the second position setting portion 72, and the third position setting portion 73 are formed in order on the side opposing the carrier 51, the first position setting portion 71 being the closest to the driving force transmission device 3. These setting portions 71, 72, and 73 are formed as recesses having a width of about t+d in the axial direction of the first worm gear 41. The dimension d is a small length in relation to t, and provides an allowance for the position setting portion 52 and ensures smooth engagement between gears at the same time. In other words, the setting portions 71, 72, and 73 have nearly the same width as the position setting portion 52, so that they substantially fit to the position setting portion 52 as the carrier 51 moves. Thus, the movement of the carrier 51 is restricted widthwise.

The portion beyond an end surface 74a of the switching lock main body 70 on the side of the driving force transmission device 3 provides the fourth position setting portion 74.

More specifically, the positions where the rectangular position setting portion 52 of the carrier 51 fits to the first position setting portion 71, the second position setting portion 72, and the third position setting portion 73 are defined as the first position, the second position, and the third position, respectively. The position where one side surface 52a of the position setting portion 52 abuts against one side surface 74a of the switching lock main body 70 is defined as the fourth position or the home position.

A protuberance 77 for detecting a state of the driving force transmission gear position setting device 7 is provided on a side surface of the switching lock main body 70, the side surface being opposite from the side surface opposing the carrier 51. The protuberance 77, in cooperation with a photo interrupter 79, functions as a device for detecting a state of the driving force transmission gear position setting device 7. To be more specific, the photo interrupter 79 makes it possible to detect a rotational state of the driving force transmission gear position setting device 7 rotated by the shaft 78.

A protuberance 76 for controlling the rotation of the driving force transmission gear position setting device 7 extends downwardly from the bottom surface of the switching lock main body 70. The protuberance 76, having a columnar shape, is placed in a forked arm 83 of the switching member 8, which will be described hereinafter.

The switching member 8 is provided under the driving force transmission gear position setting device 7. A switching member main body 81 is supported by a shaft 81a provided at the center thereof such that it may rotate in a horizontal plane. The forked arm 83 extending substantially parallel with the axial direction of the first worm gear 41 is formed on one side of the switching member main body 81. In the switching member main body 81, a pin 82 engaging a plunger device 9 is protuberantly provided downward on the arm portion extending in a direction at about 90 degrees with respect to the direction in which the forked arm 83 extends.

The plunger device 9 is a known device composed of a plunger 91 equipped with a coil spring 93 and a solenoid 92. The plunger 91 moves forward or backward parallel with the axial direction of the first worm gear 41 by the electromagnetic induction of the solenoid 92. The solenoid 92 is connected to a plunger driver 210 to receive current. The proximal circumferential portion of the plunger 91 is provided with a groove in which the pin 82 of the switching member 8 is received. Thus, the switching member main body 81 rotates about the shaft 81a on a horizontal surface as the plunger 91 moves forwardly or backwardly.

Figure 3:
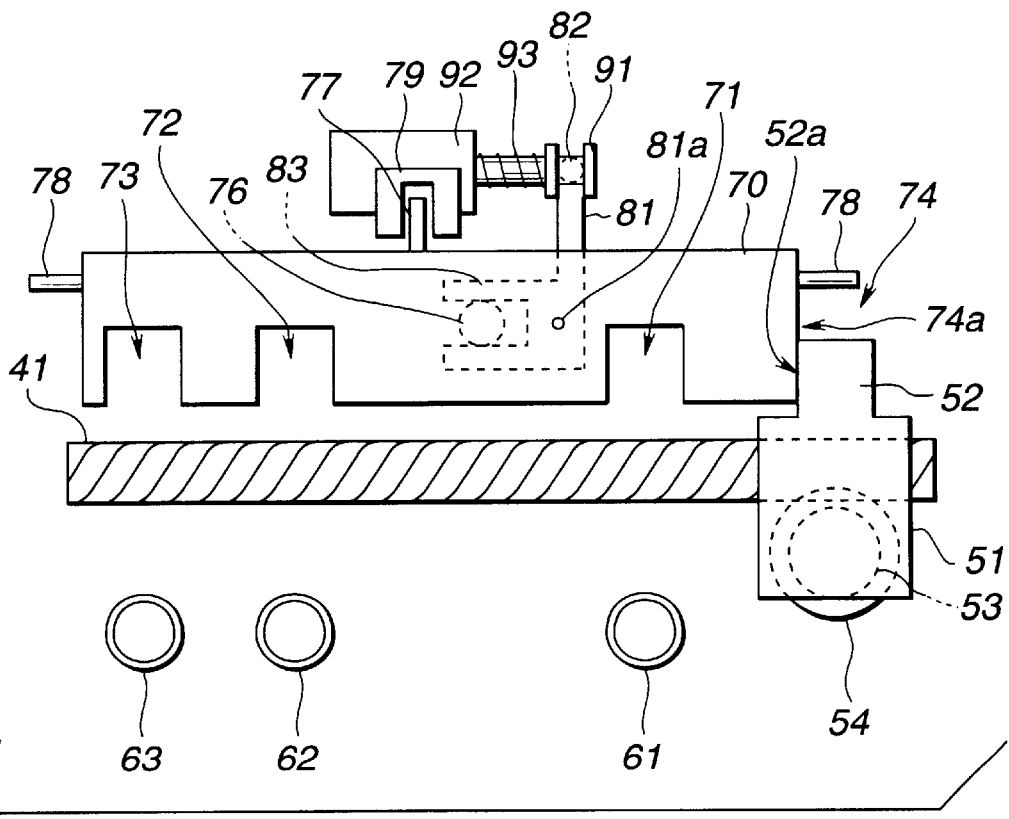
FIG. 3 is a plan view of the driving force transmission gear device, a driving force transmission gear position setting device, a switching member, and a plunger device when the driving force transmission gear device is in an initial position, namely, a fourth position, in the driving force transmission switching apparatus of the first embodiment.

Referring now to FIG. 1 and FIG. 3, the states of the driving force transmission gear device 5, the driving force transmission gear position setting device 7, the switching member 8, and the plunger device 9 in an initial state will be briefly explained.

In the initial state, no current is supplied to the solenoid 92, so that the plunger 91 is disposed in a position where it is retracted from the solenoid 92 (FIG. 3) by the urging force of the coil spring 93. The switching member main body 81, having the pin 82 that engages the groove of the plunger 91, is in a state wherein the forked arm 83 is parallel with the axial direction of the first worm gear 41 as illustrated.

The protuberance 76 for controlling rotation that is received in the arm 83 is oriented downwardly, therefore, the switching lock main body 70 is maintained in a horizontal state rather than being rotated by the shaft 78.

The state detecting protuberance 77 in the driving force transmission gear position setting device 7 is positioned for interrupting optical signals of the photo interrupter 79, hence, the photo interrupter 79 is in an OFF state.

The carrier 51 of the driving force transmission gear device 5 is placed in the fourth position, i.e., the home position. The side surface 52a of the position setting portion 52 abuts against the side surface 74a of the switching lock main body 70, and a side surface 51e of the carrier 51 opposes a fixing portion 100 of a camera main body with a very small gap provided therebetween, thus restricting the movement of the carrier 51.

Figure 4:
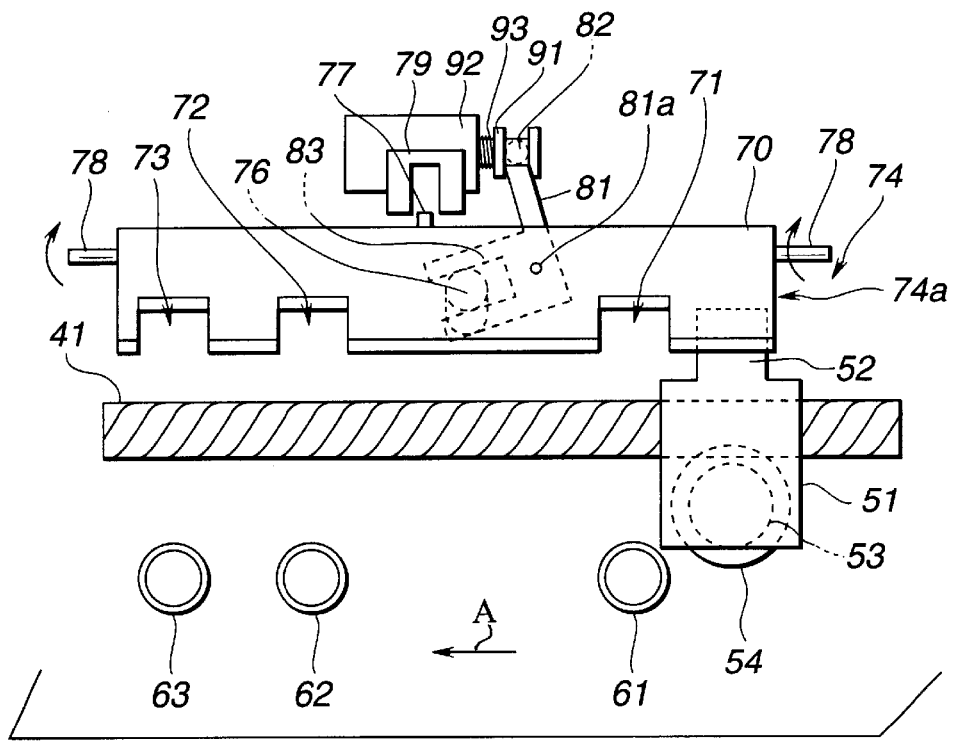
FIG. 4 is a plan view of the driving force transmission gear device, the driving force transmission gear position setting device, the switching member, and the plunger device when the driving force transmission gear device has moved from the initial position to a first position in the driving force transmission switching apparatus of the first embodiment.
Figure 5:
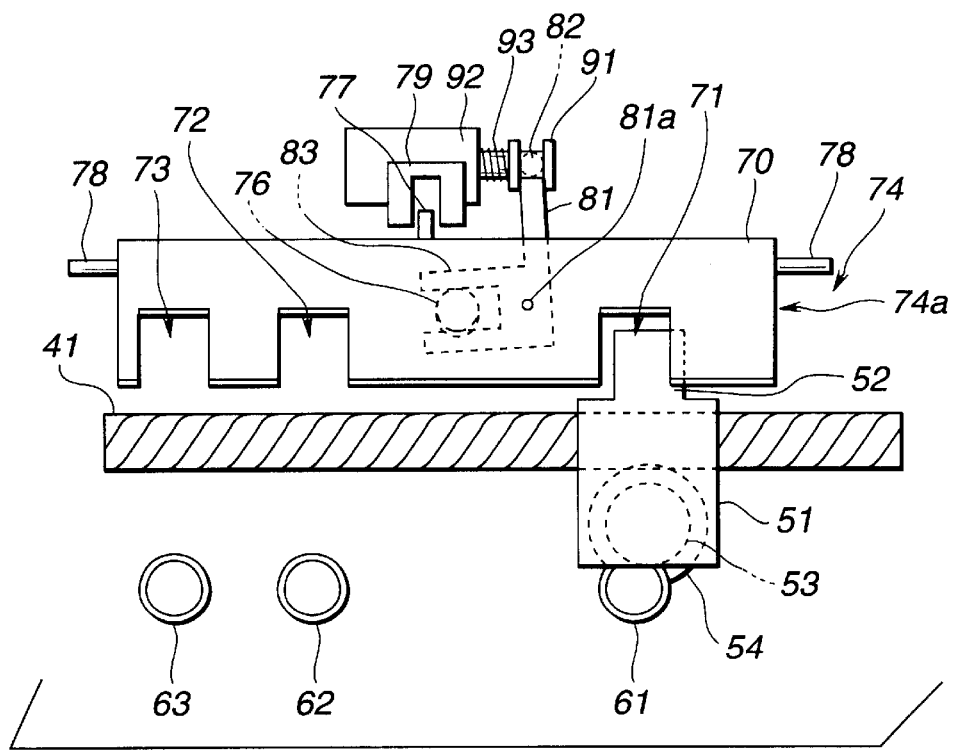
FIG. 5 is a plan view of the driving force transmission gear device, the driving force transmission gear position setting device, the switching member, and the plunger device when the driving force transmission gear device has reached a vicinity of the first position when moving from the initial position to the first position in the driving force transmission switching apparatus of the first embodiment.
Figure 6:
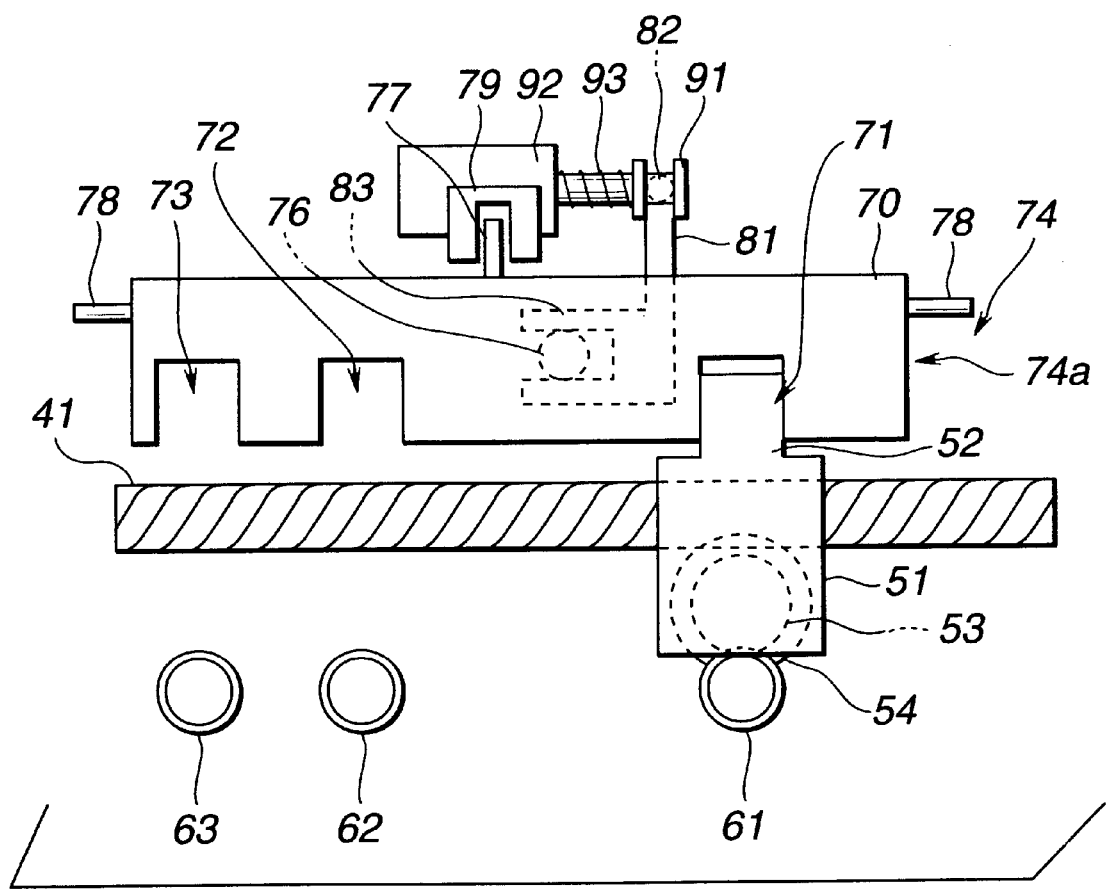
FIG. 6 is a plan view of the driving force transmission gear device, the driving force transmission gear position setting device, the switching member, and the plunger device when the driving force transmission gear device is in the first position in the driving force transmission switching apparatus of the first embodiment.

Referring now to FIG. 4 through FIG. 6, the operations of the foregoing respective devices that are performed when the carrier 51 moves from the initial position or the fourth position (FIG. 3) to the first position will be described.

To move the carrier 51, first, current is supplied from a plunger driver 210 to the solenoid 92. The moment current is supplied to the solenoid 92, the plunger 91 is drawn into the solenoid 92 against the urging force of the coil spring 93 as shown in FIG. 4. This guides the pin 82 in the same direction, causing the switching member main body 81 to rotate counterclockwise about the shaft 81a.

As the switching member main body 81 rotates, the rotation controlling protuberance 76 in the forked arm 83 moves upwardly. In other words, the switching lock main body 70 circularly moves upwardly about the shaft 78. This sets the carrier 51 free to move.

In this state, that is, in the state wherein the switching lock main body 70 has moved upwardly, the first worm gear 41 is rotated in a predetermined direction thereby to move the carrier 51 in a direction A, as shown in FIG. 4. FIG. 4 shows when the carrier 51 has slightly moved due to the rotation of the first worm gear 41. In FIG. 4, the distal end of the position setting portion 52 of the carrier 51 is located under the switching lock main body 70.

The state detecting protuberance 77 retracts from the position interrupting the optical signals of the photo interrupter 79. This turns the photo interrupter 79 ON.

When the first worm gear 41 is further rotated from the state shown in FIG. 4, the carrier 51 further moves in the direction A. When the position setting portion 52 of the carrier 51 reaches a point in the vicinity of the first position setting portion 71 of the switching lock main body 70, as illustrated in FIG. 5, supply of current to the solenoid 92 is cut off. The method for detecting that the position setting portion 52 has reached the point near the first position setting portion 71 will be described hereinafter.

The moment the supply of current to the solenoid 92 is cut off, the plunger 91 moves to the retraction position by the urging force of the coil spring 93. This causes the switching member main body 81 that engages the groove of the plunger 91 with the pin 82 to rotate clockwise about the shaft 81a, so that the forked arm 83 is shifted back to the initial state wherein it is parallel with the axial direction of the first worm gear 41. The rotation controlling protuberance 76 in the arm 83 is also shifted back down, causing the switching lock main body 70 to rotate about the shaft 78, thereby returning to the horizontal position.

However, the position setting portion 52 has not yet reached the position where it engages the first position setting portion 71, hence, the switching lock main body 70 rests one end thereof on the top surface of the position setting portion 52. This means that the switching lock main body 70 is in a state wherein it is ready to return to the initial state as soon as the position setting portion 52 engages the first position setting portion 71.

In the state illustrated in FIG. 5, the state detecting protuberance 77 has not yet returned to the position for interrupting the optical signals of the photo interrupter 79, thus the photo interrupter 79 is still ON.

When the carrier 51 further moves and reaches the position where the setting portion 52 engages the first position setting portion 71 as shown in FIG. 6, the switching lock main body 70 rotates downwardly due to the urging force of the coil spring 93 of the plunger device 9, causing the first position setting portion 71 to engage the position setting portion 52. This state corresponds to "the first position". The plunger device 9, the switching member 8, and the driving force transmission gear position setting device 7 are in the initial state.

When the carrier 51 reaches the first position shown in FIG. 6, the spur gear 53 in the carrier 51 meshes with the first driven gear 61. Therefore, when the first worm gear 41 rotates the driving force of the motor 1 can be transmitted to the first driven gear 61 via the spur gear 53. The movement of the carrier 51 is restricted by the engagement between the first position setting portion 71 and the position setting portion 52, so that the rotational force of the first worm gear 41 is used only for driving the first driven gear 61.

An electrical circuit configuration of the driving force transmission switching apparatus of the first embodiment will now be described.

Figure 7:
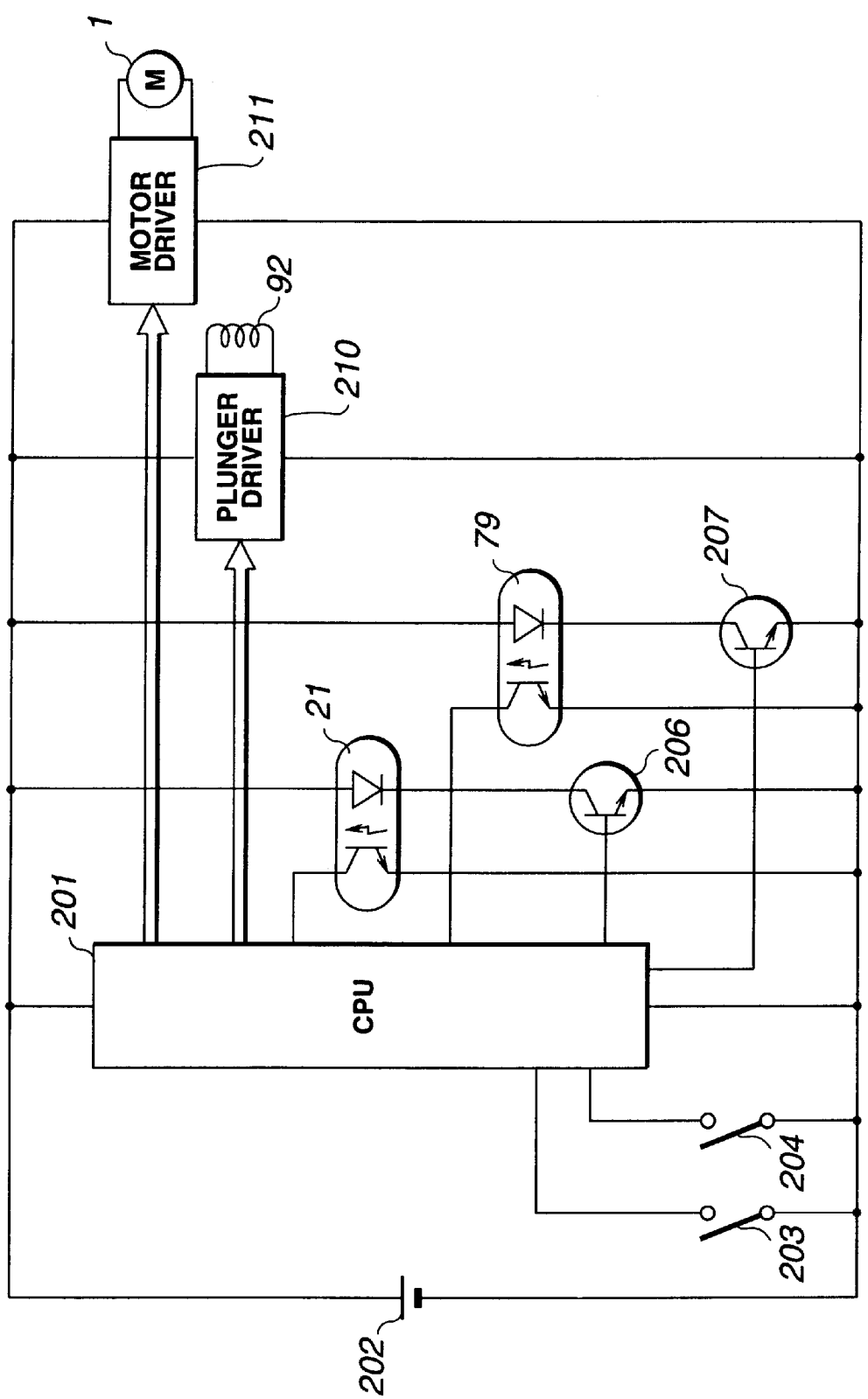
FIG. 7 is a circuit diagram showing an electrical configuration of the driving force transmission switching apparatus of the first embodiment.

FIG. 7 is a circuit diagram showing the electrical configuration of the driving force transmission switching apparatus of the first embodiment. A CPU 201 controls circuits in the driving force transmission switching apparatus and also all circuits in a camera to which the driving force transmission switching apparatus is applied.

The camera is equipped with a battery 202 that supplies power to the CPU 201, the motor 1, etc. A main switch 203 and a release switch 204 are connected to the CPU 201.

A photo interrupter 21, for detecting the revolution of the motor 1, and the photo interrupter 79, for detecting a state of the driving force transmission gear position setting device 7, also are connected to the CPU 201 to receive signals from the photo interrupters. The light emission of LEDS in the photo interrupters 21 and 79 is controlled by drive transistors 206 and 207 that are controlled by the CPU 201.

A motor driver 211 and a plunger driver 210, acting as a driving circuit of the motor 1, and a driving circuit of the solenoid 92, respectively, are connected to the CPU 201. Thus, turning the motor 1 and the solenoid 92 on and off is controlled by the CPU 201.

Figure 8:
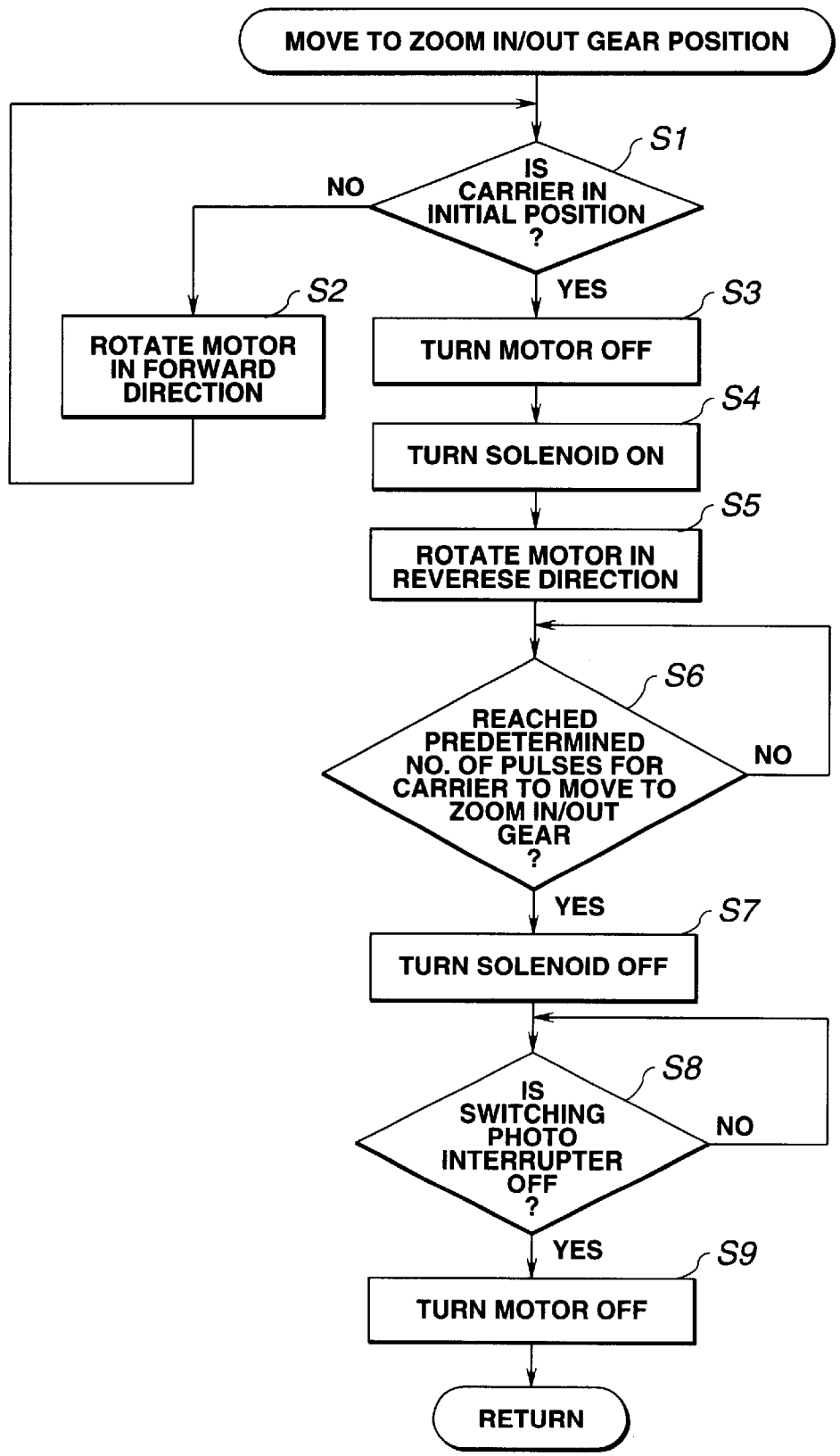
FIG. 8 is a flow chart illustrating a control procedure for moving the driving force transmission gear device from the initial position, namely, the fourth position, to the first position in the driving force transmission switching apparatus of the first embodiment.

Referring to FIG. 8, a control procedure for moving the carrier 51 in the driving force transmission switching apparatus of the present embodiment having the configuration set forth above will be described. First, a control procedure for moving the carrier 51 from the initial position or the fourth position to the first position will be described with reference to the flow chart shown in FIG. 8.

The CPU 201 first determines, with a detecting device (not shown), whether the carrier 51 is disposed in the initial position or the fourth position (step S1). If the carrier 51 is not in the initial position, then the CPU 201 drives the motor driver 211 to run the motor 1 in the forward direction, or clockwise, so as to dispose the carrier 51 in the fourth position (step S2). Specifically, the carrier 51 abuts the side surface 51e thereof against the fixing member 100 to assume the initial position.

When the carrier 51 is placed in the initial position in step S1, the CPU 201 turns the motor 1 OFF (step S3), and drives the plunger driver 210 to turn the solenoid 92 ON (step S4). This causes the plunger 91 to be drawn into the solenoid 92, with the engaging pin 82 being led in the same direction (see FIG. 4). The switching member main body 81 rotates counterclockwise about the shaft 81a, in FIG. 4. As a result, the rotation controlling protuberance 76 in the forked arm 83 rotates upwardly and the switching lock main body 70 rotates upwardly about the shaft 78. This frees the carrier 51 to move.

Thereafter the CPU 201 runs the motor 1 in the reverse direction, or counterclockwise (step S5). This causes the carrier 51 to move in the direction A in FIG. 4. In addition, the CPU 201 ascertains the rotational amount of the motor 1 on the basis of a pulsed signal received from the photo interrupter 21 for detecting the revolution of the motor 1. The CPU 201 determines whether the pulsed signal transmitted a predetermined number of pulses whether the spur gear 53 incorporated in the carrier 51 engages the first driven gear 61 (zooming in/out gear), as shown in FIG. 5, proximate to the first position (step S6).

When the pulsed signal from the photo interrupter 21 reaches the predetermined value, the CPU 201 stops supply of current to the solenoid 92 (step S7). At this time, the switching lock main body 70 is just about to mate with the position setting portion 52, as illustrated in FIG. 5. The predetermined number of pulses is recorded beforehand in a recording device (not shown) so that the CPU 201 can read the value whenever necessary.

Then, the CPU 201 ascertains the state of the switching lock main body 70 through the photo interrupter 79 (step S8). If the CPU 201 detects that the photo interrupter 79 has been switched from an ON state to an OFF state, then it decides that the position setting portion 52 has engaged the first position setting portion 71, i.e., that the carrier 51 has reached the first position. After that, the CPU 201 turns the motor 1 OFF (step S9) and terminates the routine for moving to the first position.

A zooming sequence will now be described briefly.

The CPU 201 checks that the carrier 51 has been set at the first position, as set forth above (see FIG. 6), then causes the motor 1 to run in an appropriate direction for zooming in or zooming out. This causes the first worm gear 41 to rotate via the speed reducer 33, the sun gear 31, the carrier drive gear 35, and the carrier drive gear train 36, and the first driven gear 61 rotates via the helical gear 54 and the spur gear 53. Following the first driven gear 61, there is connected a zooming drive device (not shown) driven by the driving force of the motor 1.

Figure 9:
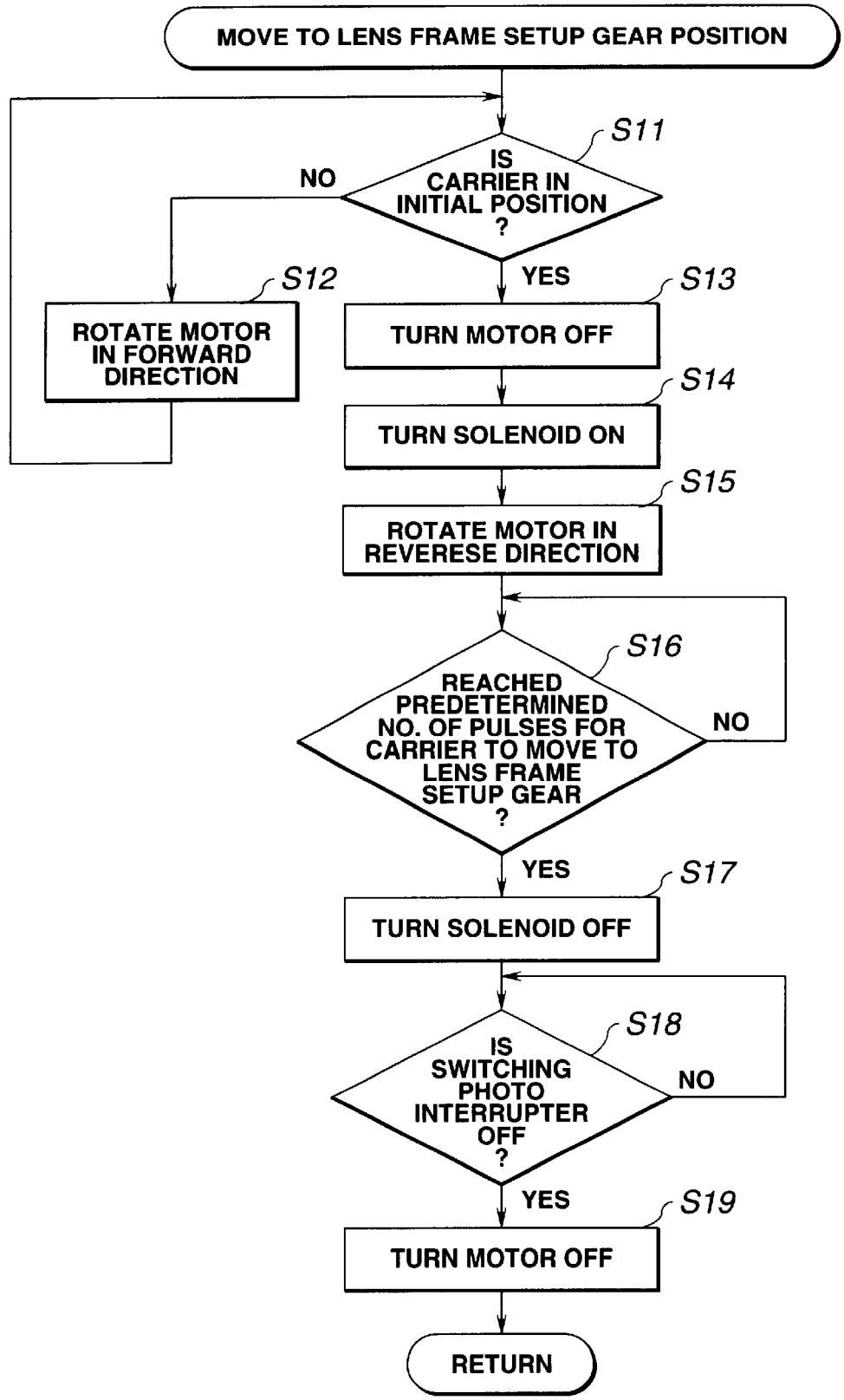
FIG. 9 is a flow chart illustrating a control procedure for moving the driving force transmission gear device from the initial position, namely, the fourth position, to the second position in the driving force transmission switching apparatus of the first embodiment.

Referring to FIG. 9 a control procedure for moving the carrier 51 from the initial position or the fourth position to the second position will be described. A basic control procedure is identical to the routine for moving to the first position shown in FIG. 8, so will be only briefly explained.

The CPU 201 checks whether the carrier 51 is disposed in the initial position in the same manner as that mentioned above (step S11 and step S12), then turns the motor 1 OFF (step S13) and turns the solenoid 92 ON (step S14). This causes the switching lock main body 70 to rotate upwardly about the shaft 78, freeing the carrier 51 to move as set forth above.

After that, the CPU 201 runs the motor 1 in the reverse direction, or counterclockwise, (step S15) and determines whether the pulses of a pulsed signal from the photo interrupter 21 has reached a predetermined number of pulses, i.e., whether the number of pulses has been reached at which the carrier 51 reaches a point in the vicinity of the second position setting portion 72 (step S16).

Figure 10:
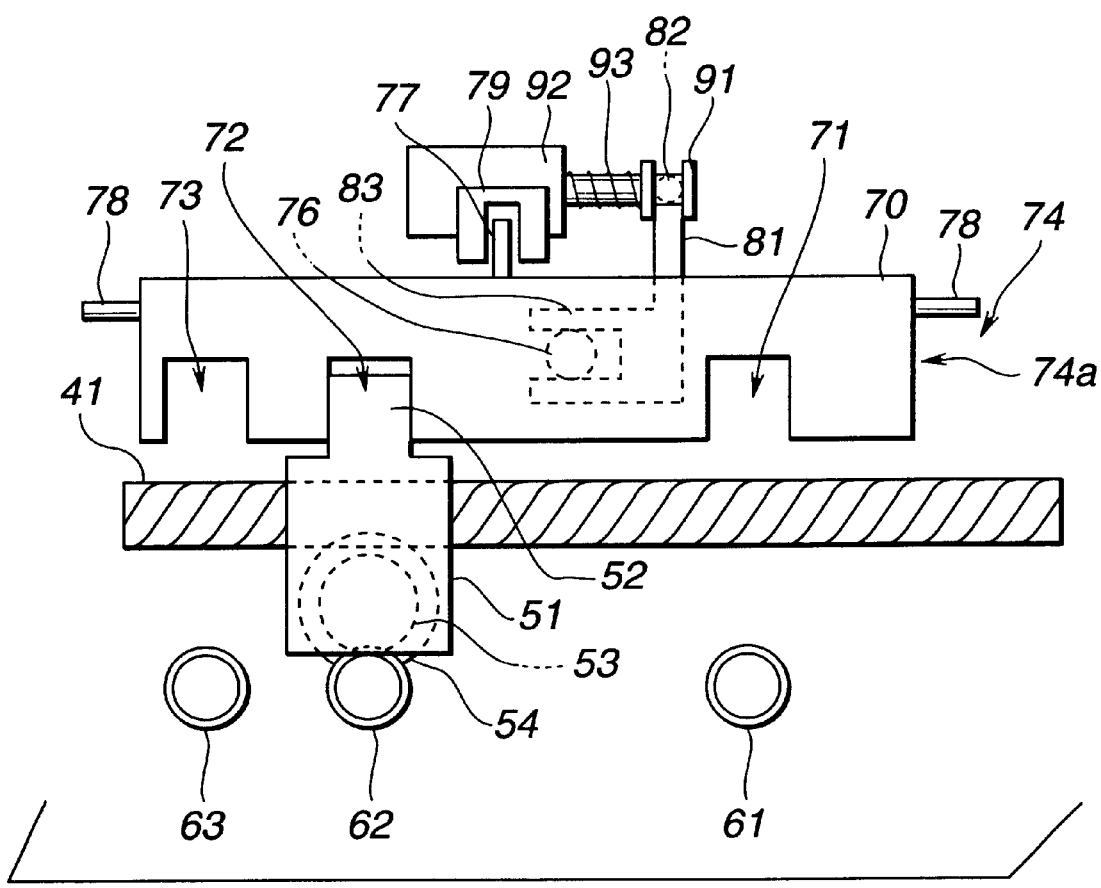
FIG. 10 is a plan view of the driving force transmission gear device, the driving force transmission gear position setting device, the switching member, and the plunger device when the driving force transmission gear device is in the second position in the driving force transmission switching apparatus of the first embodiment.

If the pulsed signal from the photo interrupter 21 has reached the predetermined value, then the CPU 201 stops the supply of current to the solenoid 92 (step S7). If the CPU 201 detects that the photo interrupter 79 has switched from an ON state to an OFF state (step S18), then the CPU 201 determines that the carrier 51 has reached the second position. At this time, the carrier 51 is restricted in movement because the position setting portion 52 is engaged with the second position setting portion 72, as illustrated in FIG. 10.

The CPU 201 then turns the motor 1 OFF (step S19) and terminates the routine for moving to the second position.

A sequence for setting up a lens barrel will now be explained briefly.

The CPU 201 checks whether the carrier 51 is at the second position (see FIG. 10), as described above, then runs the motor 1 in a predetermined direction to extend the lens barrel from a retracted position to an extended position. This causes the first worm gear 41 to rotate via the speed reducer 33, the sun gear 31, the carrier drive gear 35, and the carrier drive gear train 36, and the second driven gear 62 rotates via the helical gear 54 and the spur gear 53. Following the second driven gear 62, there is connected a lens barrel drive device (not shown), driven by the motor 1 so as to be extended from the retracted position to the extended position.

Figure 11:
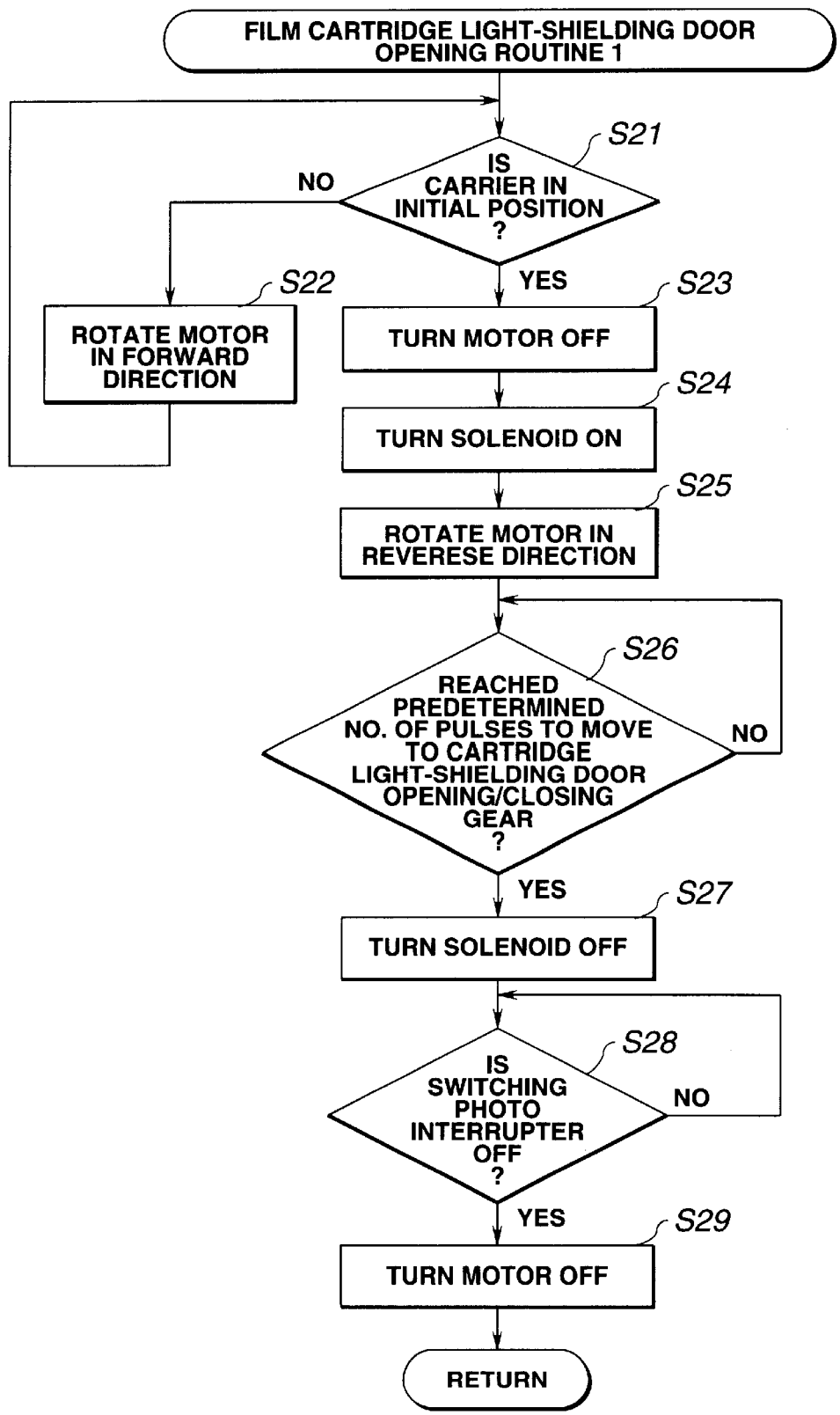
FIG. 11 is a flow chart illustrating a control procedure for moving the driving force transmission gear device from the initial position, namely, the fourth position, to the third position in the driving force transmission switching apparatus of the first embodiment.

Referring to FIG. 11, a control procedure for moving the carrier 51 from the initial position or the fourth position to the third position will be described. The basic control procedure is identical to the routine for moving to the first position shown in FIG. 8, so will be only briefly explained.

The CPU 201 checks whether the carrier 51 is disposed in the initial position in the same manner as that mentioned above (step S21 and step S22), then turns the motor 1 OFF (step S23) and turns the solenoid 92 ON (step S24). This causes the switching lock main body 70 to rotate upwardly about the shaft 78, freeing the carrier 51 to move as set forth above.

After that, the CPU 201 runs the motor 1 in the reverse direction, or counterclockwise, (step S25) and determines whether a pulsed signal from the photo interrupter 21 has reached a predetermined number of pulses, i.e., whether the number of pulses has been reached at which the carrier 51 reaches a point in the vicinity of the third position setting portion 73 (step S26).

Figure 12:
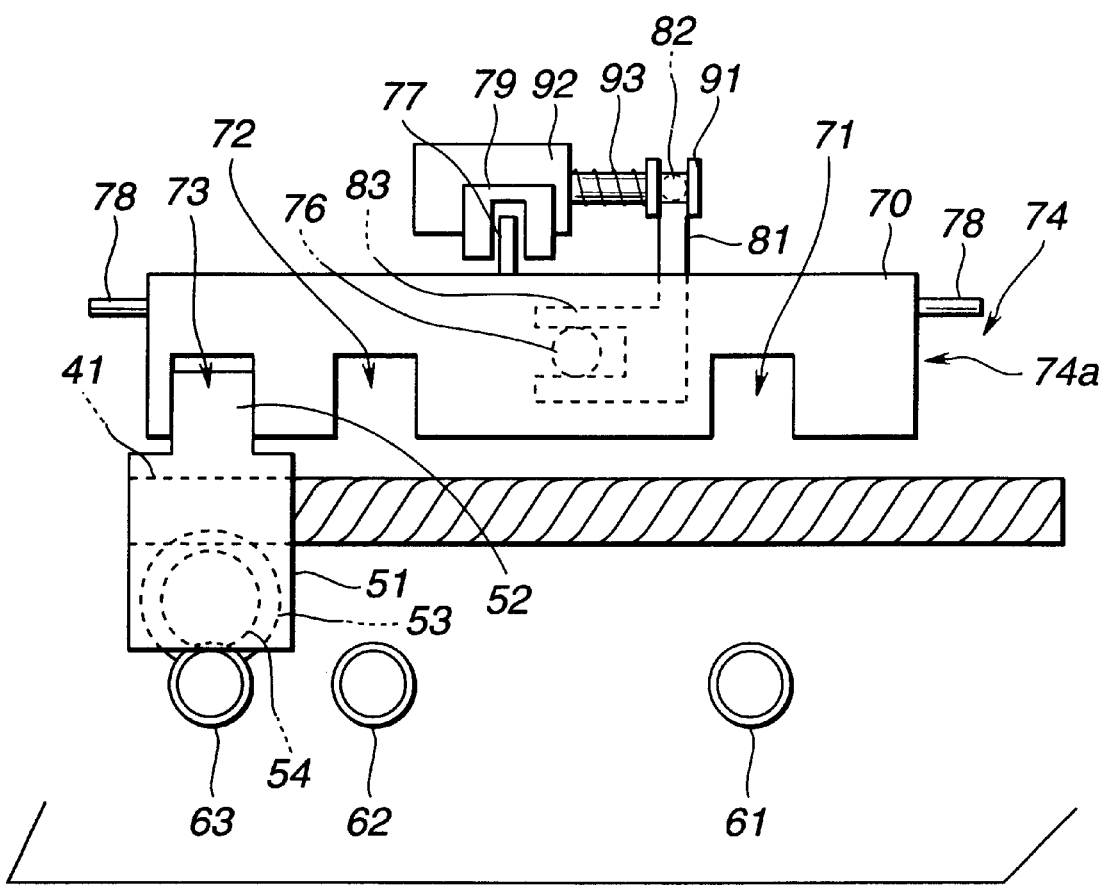
FIG. 12 is a plan view of the driving force transmission gear device, the driving force transmission gear position setting device, the switching member, and the plunger device when the driving force transmission gear device is in the third position in the driving force transmission switching apparatus of the first embodiment.

If the pulsed signal from the photo interrupter 21 has reached the predetermined value, then the CPU 201 stops the supply of current to the solenoid 92 (step S27). If the CPU 201 detects that the photo interrupter 79 has switched from an ON state to an OFF state (step S28), the carrier 51 has reached the third position. At this time, the carrier 51 is restricted in movement because the position setting portion 52 is engaged with the third position setting portion 73, as illustrated in FIG. 12.

The CPU 201 then turns the motor 1 OFF (step S29) and terminates the routine for moving to the third position.

A sequence for opening and closing a film cartridge light-shielding door will now be explained briefly.

The CPU 201 checks whether the carrier 51 is at the third position (see FIG. 12), as described above, then runs the motor 1 in a predetermined direction, namely, reverse direction, to open a film cartridge light-shielding door. This causes the first worm gear 41 to rotate via the speed reducer 33, the sun gear 31, the carrier drive gear 35, and the carrier drive gear train 36, and the third driven gear 63 rotates via the helical gear 54 and the spur gear 53. Following the third driven gear 63, there is connected a film cartridge light-shielding door opening/closing device (not shown) driven by the motor 1 to open the film cartridge light-shielding door.

Figure 13:
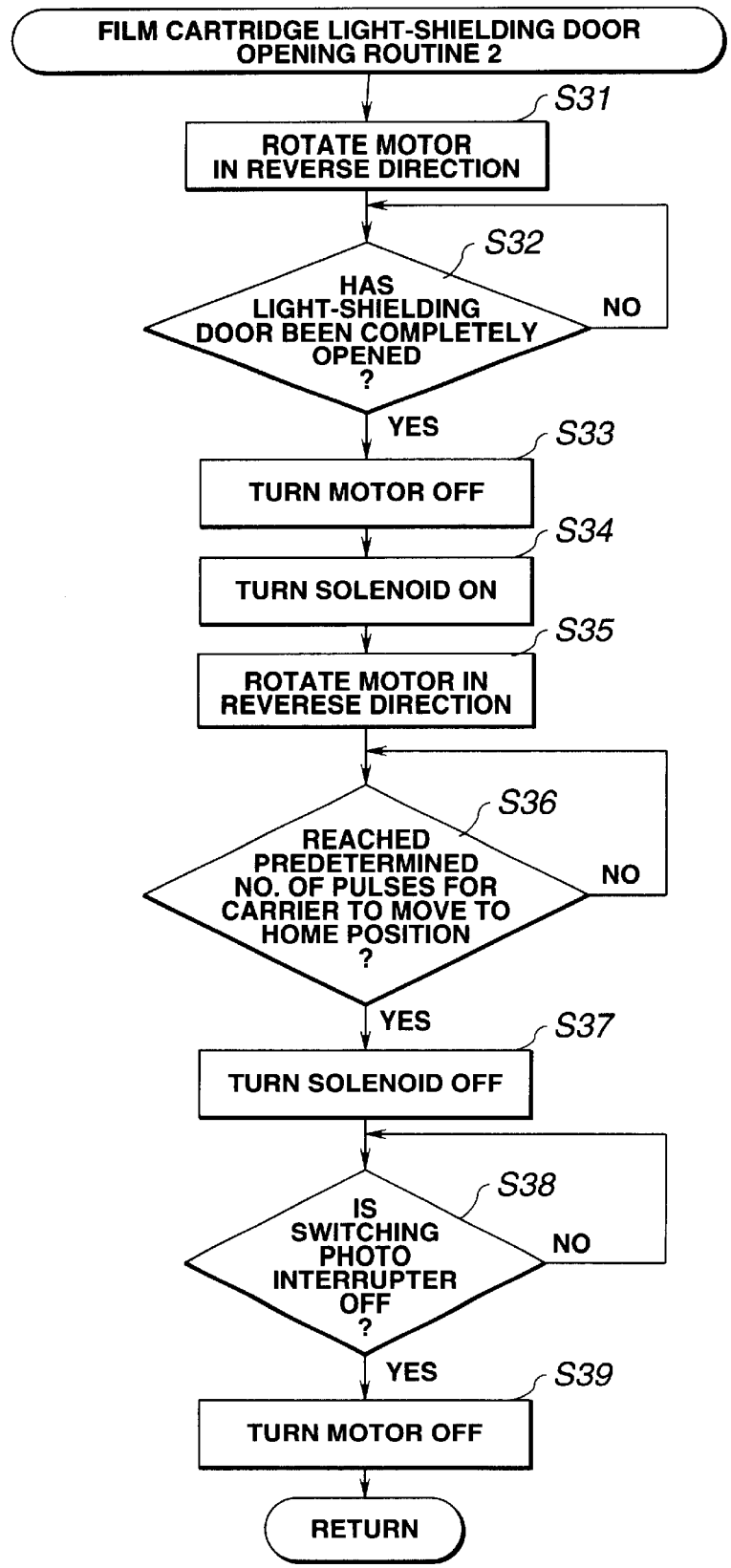
FIG. 13 is a flow chart illustrating a control procedure for moving the driving force transmission gear device from the third position to the fourth position, namely, the initial position, in the driving force transmission switching apparatus of the first embodiment.

Referring to FIG. 13, descriptions will be given of a control procedure for moving the carrier 51 from the third position to the fourth position, or the home position, after the carrier 51 is disposed at the third position and subjected to the predetermined drive steps according to the control procedure of FIG. 11.

The CPU 201 rotates the motor 1 in the reverse direction to open the film cartridge light-shielding door (step S31), and, with a detecting device (not shown) checks whether the film cartridge light-shielding door has opened (step S32), then turns the motor 1 OFF (step S33). Next, the CPU 201 drives the plunger driver 210 to turn the solenoid 92 ON (step S34). This causes the plunger 91 to be drawn into the solenoid 92 again, with the engaging pin 82 being guided in the same direction. The switching member main body 81 rotates about the shaft 81*a*, and the switching lock main body 70 rotates upwardly about the shaft 78. This frees the carrier 51 to move.

After that, the CPU 201 runs the motor 1 in the forward direction (step S35). This causes the carrier 51 to move to the fourth position. The CPU 201 ascertains the rotational amount of the motor 1 on the basis of a pulsed signal sent from the photo interrupter 21 for detecting the revolution of the motor 1 in order to decide whether the pulsed signal has reached a predetermined number of pulses, i.e., whether the number of pulses has been reached at which the carrier 51 reaches a point in the vicinity of the fourth position or the home position shown in FIG. 3 (step S36).

If the pulsed signal from the photo interrupter 21 has reached the predetermined value, then the CPU 201 stops the supply of current to the solenoid 92 (step S37). The predetermined number of pulses is recorded beforehand by a recording device (not shown) so that the CPU 201 can read the value whenever necessary as previously mentioned.

Subsequently, the CPU 201 checks the state of the switching lock main body 70 through the photo interrupter 79 (step S38). If the CPU 201 detects that the photo interrupter 79 has switched from an ON state to an OFF state, then the CPU determines that the position setting portion 52 has reached the fourth position and turns the motor 1 OFF (step S39), thus terminating the routine for moving to the fourth position.

Using the technique described above enables the carrier to be moved from an arbitrary position to another arbitrary position in an obvious manner, thus detailed description thereof will be omitted.

The driving force transmission switching apparatus of the first embodiment makes it possible to provide a smaller-sized driving force transmission switching apparatus capable of switching among a plurality of objects to which a driving force is to be transmitted.

A second embodiment of the present invention will now be described.

Figure 14:
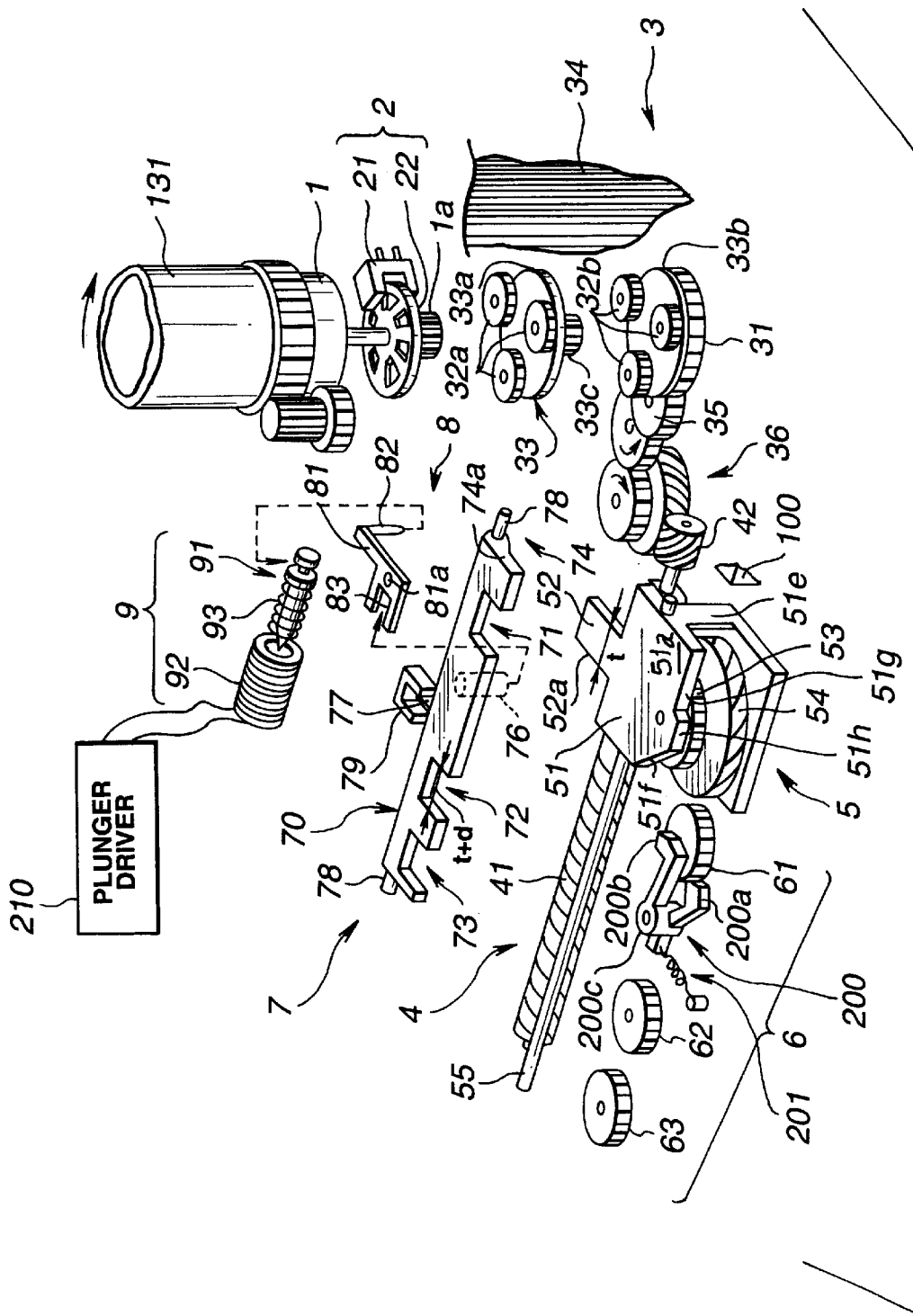
FIG. 14 is a perspective exploded view of a driving force transmission switching apparatus of a second embodiment in accordance with the present invention.

FIG. 14 is an exploded perspective view of a driving force transmission switching apparatus of a second embodiment in accordance with the present invention. For the purpose of explanation, the components of the driving force transmission switching apparatus are shown disassembled although the actual dispositions of the components are not necessarily as shown in the drawing.

Referring to FIG. 14, the driving force transmission switching apparatus of the second embodiment is equipped with: a motor 1 acting as a drive source of driven devices provided in a camera to which the driving force transmission switching apparatus is applied; a motor rotational amount detecting device 2 for detecting a rotational amount of the motor 1; a driving force transmission device 3 that transmits a driving force of the motor 1 to a worm gear device 4, discussed hereinafter; a worm gear device 4 that engages the driving force transmission device 3 and rotates by the driving force of the motor 1; a driving force transmission gear device 5 which engages the worm gear device 4 movable to in a plurality of positions as the worm gear device 4 rotates; a plurality of driven gears 6 that are disposed in positions where one of the driven gears 6 is able to engage the driving force transmission gear device 5 according to the plural positions so as to transmit the driving force of the motor 1 to a predetermined driven system; a driving force transmission gear position setting device 7 for setting the position of the driving force transmission gear device 5; a switching member 8 for shifting the driving force transmission gear position setting device 7; and a plunger device 9 for shifting the switching member 8.

The functions of the above composing elements will now be described.

The motor 1 which can be rotated in both forward and reverse directions, is provided in a film take-up spool 131 that is a hollow cylinder. A pinion gear 1*a* is provided on an output shaft of the motor 1. The motor 1 is a drive source for the driven devices provided in the camera to which the driving force transmission switching apparatus is applied.

The motor rotational amount detecting device 2 is an encoder for detecting the rotational amount of the motor 1. It is a known detecting device provided integrally with the output shaft of the motor 1 and composed of a disc 22 with openings formed along its periphery and a photo interrupter 21.

The driving force transmission device 3 is formed of: a speed reducer 33 engaging the pinion gear 1*a* of the motor 1; a sun gear 31 acting as an output gear of the speed reducer 33; a carrier drive gear 35 engaging the sun gear 31; a carrier drive gear train 36 engaging the carrier drive gear 35 to transmit a driving force to the worm gear device 4; and internal gear 34 that engages planetary gears 32*a* and 32*b* in the speed reducer 33, fully surrounding the revolution circumferences of the foregoing planetary gears.

The speed reducer 33 is a known speed reducer formed of: a first planetary gear group composed of three planetary gears 32*a* that are provided on one surface of a first disc 33*a*, and rotate and revolve, meshing with the motor pinion gear 1*a*; a gear 33*c* coaxially provided on the other surface of the first disc 33*a*; a second planetary gear group composed of three planetary gears 32*b* that are provided on one surface of a second disc 33*b*, and rotate and revolve, meshing with the gear 33*c*; and the internal gear 34 that meshes with and surrounds these groups of planetary gears 32*a* and 32*b*.

The sun gear 31 is provided integrally with the disc 33*b* on the other surface of the second disc 33*b* and rotates in either the forward or reverse direction according to the revolution of the motor 1. The sun gear 31 rotates via the speed reducer 33 so that it rotates at a number of revolutions that is less than that of the motor 1.

A carrier driving gear 35, acting as part of a drive system of a carrier 51, discussed hereinafter, in a driving force transmission gear device 5 always is engaged with the sun gear 31. A second worm gear 42 of a worm gear device 4 engages the carrier driving gear 35 via a gear train 36.

A driving force transmission rotary carrier (not shown), for transmitting a driving force to a film cartridge spool drive system and a film take-up spool drive system, is provided on the other surface of the sun gear 31. Thus, the sun gear 31 transmits a driving force to the driving force transmission gear device 5 (the carrier driving system) and also to transmits a driving force to the film cartridge spool drive system and the film take-up spool drive system.

The worm gear device 4 is formed of the second worm gear 42 that engages the carrier driving gear train 36, which is an end of a driving force transmission device 3, and a first worm gear 41 that is provided coaxially with the second worm gear 42 and engages the driving force transmission gear device 5. This means that the first worm gear 41 is rotated by a driving force of the motor 1 supplied via the driving force transmission device 3 (the speed reducer 33, the sun gear 31, the carrier driving gear 35, and the carrier driving gear train 36), and the first worm gear 41 transmits the driving force to the driving force transmission-gear device 5. In other words, the first worm gear 41 rotates whenever the motor 1 rotates.

The driving force transmission gear device 5 is constituted by a helical gear 54 that meshes with the first worm gear 41, a spur gear 53 formed coaxially and integrally with the helical gear 54 on one surface of the helical gear 54, a guide rod 55 provided parallel with the axis of the first worm gear 41, and a carrier 51 that rotatably clamps a driving force transmission gear formed of the helical gear 54 and the spur gear 53 and moves in parallel to the axial direction of the first worm gear 41 guided by the guide rod 55.

Figure 15:
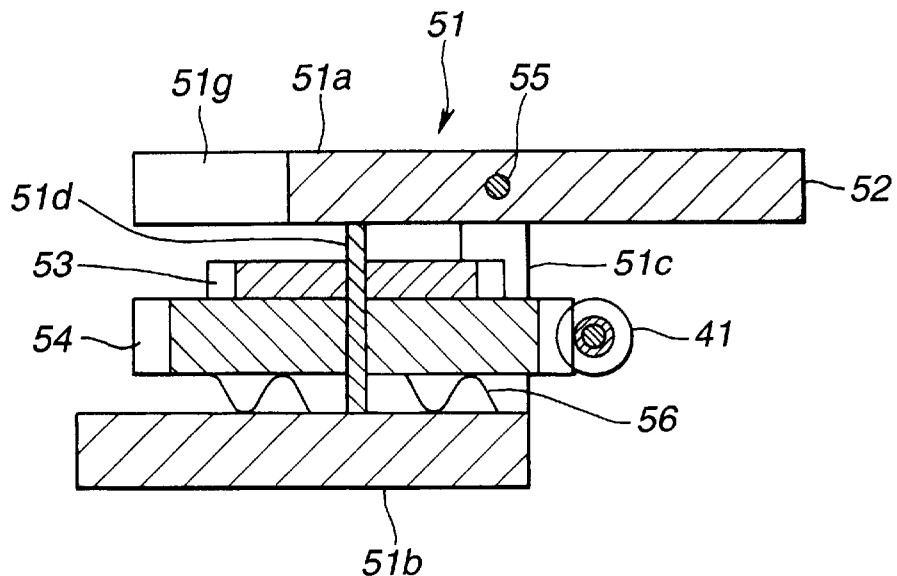
FIG. 15 is a sectional view illustrating a configuration of a driving force transmission gear device in the driving force transmission switching apparatus of the second embodiment.

The carrier 51 is constructed by a first plate 51a and an opposing second plate 51b which coupled by a pillar 51c, as shown in FIG. 15. A shaft S1d couples substantially the centers of the opposing surfaces of the two plates, the shaft 51d rotatably supporting the driving force transmission gear composed of the spur gear 53 and the helical gear 54. A friction device 56 creates friction between the helical gear 54 and the second plate sib. The friction device 56 provides a friction for transmitting the moving force of the helical gear 54 to be transmitted to the carrier 51 without interfering with the rotation of the helical gear 54.

A position setting portion 52 that engages a driving force transmission gear position setting device 7 extends from one end of the first plate 51a. The position setting portion 52 has a rectangular shape having a width t in an axial direction of the first worm gear. The position setting unit 52 engages a plurality of position setting portions formed on the driving force transmission gear position setting unit 7, discussed in detail hereinafter.

As shown in FIG. 14, both ends of the other end surface of the first plate 51a are cut to form a slant surface 51f and a cut surface Big. The slant surface E1f, the cut surface 51g, and the other end surface portion (an abutting and retaining surface 51h) of the first plate 51a between the slant surface 51f and the cut surface 51g control the operation of a locking device 200, discussed hereinafter. More specifically, the surfaces 51f, 51h, and 51g come in contact with an abutting hook 200b of the locking device 200 as the carrier 51 moves, thereby controlling the shifting of the locking device 200. The locking device 200 locks, retains, or unlocks the first driven gear 61, discussed in detail hereinafter.

The driving force transmission gear formed of the spur gear 53 and the helical gear 54 rotates as the first worm gear 41 rotates by the helical gear 54 engaging the first worm gear 41. As the first worm gear 41 rotates, the helical gear 54 generates a thrust or moving force parallel with the axis of the first worm gear 41.

As set forth above, in this embodiment, the friction device 56 provided between the helical gear 54 and the carrier 51 (the second plate sib) transmits the thrust of the helical gear 54, which is generated by the rotation of the first worm gear 41, to the carrier 51. The carrier 51 together with the helical gear 54 and the spur gear 53 move parallelly with the axis of the first worm gear 41 guided by the guide rod 55.

Thus, the carrier 51 that includes the spur gear 53 and the helical gear 54 is moved parallelly with the axis of the first worm gear 41 by the driving force of the motor 1. This embodiment is characterized in that the carrier 51 is set in a plurality of set positions by a combination of the driving force transmission gear position setting device 7 and the plural driven gears of the driven gear assembly 6. This will be described in more detail hereinafter.

The driven gear assembly 6 includes three driven gears 61, 62, and 63 in the present embodiment. These driven gears constitute a part of the driving system of the driven device as shown below:

1st driven gear 61: Performs zooming in/out operation.

2nd driven gear 62: Sets up a lens barrel.

3rd driven gear 63: Opens/closes film cartridge light-shielding door.

The first driven gear 61, the second driven gear 62, and the third driven gear 63 are disposed in order parallel with the axis of the first worm gear 41 so that they are keyed to the respective set positions discussed hereinafter. In other words, the driven gears are provided in a row.

The driving force transmission switching apparatus of the embodiment has the four set positions in which the carrier 51 is set in association with the driven gear assembly 6 composed of the plural different driven gears. More specifically, the carrier 51 is set in any of the following four positions:

1st position: The spur gear 53 engages the 1st driven gear 61.

2nd position: The spur gear 53 engages the 2nd driven gear 62.

3rd position: The spur gear 53 engages the 3rd driven gear 63.

4th position: Home position or initial position where the spur gear 53 does not engage any of the above driven gears.

Among the positions shown above, the fourth position, i.e., the home position or the initial position, is the closest to the driving force transmission device 3, the first position, the second position, and the third position being farther from the fourth position in this order.

Among the above positions, if the first through third positions are defined as the positions for transmitting the driving force of the motor 1 and the fourth position is defined as the position for engaging none of the driven gears 6 so as to transmit no driving force, then the driving force transmission gear device 5 engages the worm gear device 4 and moves parallelly with the axis of the worm gear as the worm gear rotates to set the driving force transmission gear device 5 at one of the positions for transmitting the driving force of the motor 1 or at the position for not transmitting the driving force of the motor 1. Likewise, the driven gears of the driven gear assembly 6 may be provided in the positions where they engage the driving force transmission gear device 5 when the driving force transmission gear device 5 is at any of the driving force transmitting positions, thereby receiving the driving force of the motor 1 via the driving force transmission gear device 5.

The locking device 200 engages first driven gear 61 to lock or unlock, permitting or prohibiting the rotation of, the first driven gear 61. The locking device 200 is located in the vicinity of the first driven gear 61, formed by two levers that are free to rotate about a support section 200c fixed to a bottom board of the driving force transmission switching apparatus. A locking hook 200a that is engageable with the first driven gear 61 is formed on the distal end of one arm of a first lever, while the abutting hook 200b that abuts against the surfaces E1f, 51h, and 51g of the carrier 51 is formed on the distal end of one arm of a second lever.

The first and second levers rotate together about the support section 200c. An urging spring 201 for urging the locking hook 200a and the abutting hook 200b counter-clockwise in FIG. 14 is provided so that one end thereof is attached to an arm connected to the first and second levers and the other end thereof is attached to the bottom board of the driving force transmission switching apparatus. The urging force of the urging spring 201 causes the locking hook 200a to engage the first driven gear 61, thereby locking the first driven gear 61.

The first driven gear 61 is held in a stationary state even if the spur gear 53 is not engaged with the first driven gear 61. The spur gear 53 engages at least at the first position. Hence, the zooming in/out device associated with the first driven gear 61 also will be locked, so that the zooming in/out device will not be affected by an external force applied to a camera or the like to which the driving force transmission switching apparatus is applied.

The first driven gear 61, locked and retained by the locking hook 200a, is released when the abutting hook 200b comes in contact with the surfaces 51f and 51h of the carrier 51. More specifically, when the carrier 51 moves and causes the abutting hook 200b to abut against the slant surface E1f, the abutting hook 200b is rotated clockwise, as shown in FIG. 14, against the urging force of the urging spring 201. As the abutting hook 200b rotates, the locking hook 200a integrally formed with the abutting hook 200b also rotates clockwise. This causes the locking hook 200a to move away from the first driven gear 61, unlocking the first driven gear 61.

In the present embodiment, the composing elements are disposed so that the engagement between the spur gear 53 and the first driven gear 61 occurs before the slant surface 51f contacts with the abutting hook 200b. The carrier 51 converts the driving force of the first worm gear 41 into the moving force of the carrier 51 by means of the friction device 56 (see FIG. 15) until the slant surface 51f contacts the abutting hook 200b. However, since the engagement between the spur gear 53 and the first driven gear 61 occurs before the slant surface 51f comes in contacts the abutting hook 200b, the efficiency of conversion into the moving force of the carrier 51 can be enhanced, thus permitting smooth movement of the carrier 51 despite the load realized from rotating the abutting hook 200b.

As the carrier 51 moves until the abutting hook 200b reaches the abutting and retaining surface 51h, the locking hook 200a separates from the first driven gear 61. Under this condition, the first driven gear 61 engages with the spur gear 53, and the zooming in/out device is controlled by a predetermined driving force.

After that, as the carrier 51 moves until the abutting hook 200b passes the abutting and retaining surface 51f and reaches the cut surface B1g, the locking hook 200a is rotated counterclockwise again by the urging spring 201. This causes the locking hook 200a to engage with the first driven gear 61 again, thereby unlocking the first driven gear 61. After the locking hook 200a engages the first driven gear 61, the engagement between the spur gear 53 and the first driven gear 61 is released.

Thus, the first driven gear 61 always engages the locking hook 200a or the spur gear 53 thus, the first driven gear 61 is not freed, making it possible to prevent malfunctions due to an external force applied.

Figure 30:
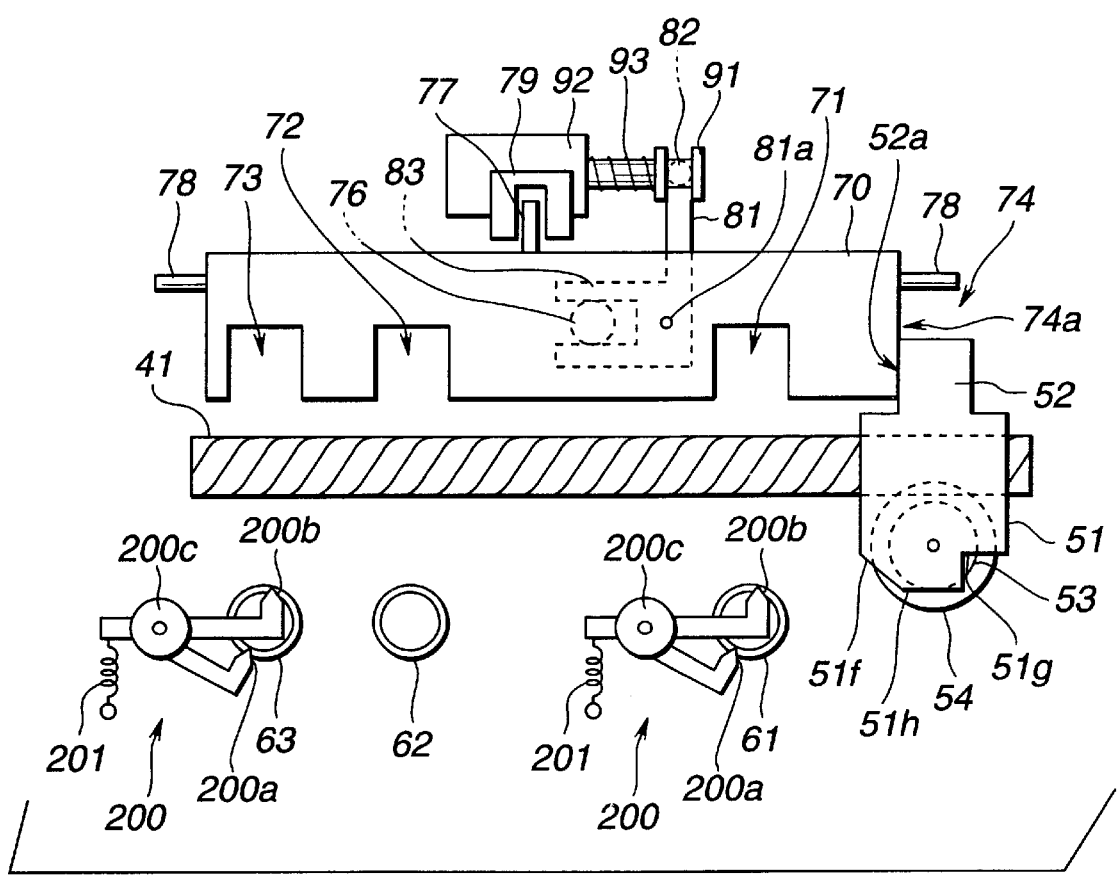
FIG. 30 is a plan view of a driving force transmitting gear device, a driving force transmission gear position setting device, a switching member, and a plunger device when a locking device has been applied to another driven gear in the driving force transmission switching apparatus of the second embodiment.

In the second embodiment, the locking device 200 is described as being applied only to the first driven gear 61. However, the locking device 200 can be applied to other driven gears. For instance, it can be applied to the third driven gear 63, as shown in FIG. 30. In this case, individual locking devices for respective driven gears may be provided or a single locking device may be provided to simultaneously lock a plurality of driven gears.

The set positions of the carrier 51 will now be described.

The set positions of the driving force transmission gear device 5 or the carrier 51 are established by the driving force transmission gear setting device 7, described below.

The driving force transmission gear position setting device 7 has a roughly comb-shaped switching lock main body 70 rotatably supported by a shaft 78 parallel with the axis of the first worm gear 41. The switching lock main body 70 has a plurality of position setting portions, namely, first through fourth position setting portions 71 through 74, respectively, that are formed on a side opposing the carrier 51. The first through fourth position setting portions 71, 72, 73, and 74 correspond to the foregoing first position, second position, third position, and fourth (home) position, respectively; they engage the rectangular position setting portion 52 extending from the first plate 51a of the carrier 51.

More specifically, in the switching lock main body 70, the first position setting portion 71, the second position setting portion 72, and the third position setting portion 73 are formed in order on the side opposing the carrier 51, the first position setting portion 71 being the closest to the driving force transmission device 3. These setting portions 71, 72, and 73 are formed as recesses having a width of about t+d in direction of the axis of first worm gear 41. The dimension d is less than dimensions t and provides an allowance for the position setting portion 52 and ensures smooth engagement between gears at the same time. In other words, the setting portions 71, 72, and 73 have nearly the same width as the position setting portion 52, so that they substantially fit to the position setting portion 52 as the carrier 51 moves. Movement of the carrier 51 is restricted widthwise.

The portion beyond an end surface 74a of the switching lock main body 70 on the side of the driving force transmission device 3 provides the fourth position setting portion 74.

More specifically, the positions where the rectangular position setting portion 52 of the carrier 51 fits to the first position setting portion 71, the second position setting portion 72, and the third position setting portion 73 are defined as the first position, the second position, and the third position, respectively. The position where one side surface 52a of the position setting portion 52 abuts against one side surface 74a of the switching lock main body 70 is defined as the fourth position or the home position.

A protuberance 77 for detecting a state of the driving force transmission gear position setting device 7 is provided on a side surface of the switching lock main body 70, the side surface being opposite from the side surface opposing the carrier 51. The protuberance 77 in cooperation with a photo interrupter 79 functions as a device for detecting a state of the driving force transmission gear position setting device 7. To be more specific, the photo interrupter 79 makes it possible to detect a rotational state of the driving force transmission gear position setting device 7 rotated by the shaft 78.

A protuberance 76 for controlling the rotation of the driving force transmission gear position setting device 7 extends downwardly from the bottom surface of the switching lock main body 70. The protuberance 76, having a columnar shape, is placed in a forked arm 83 of the switching member 8, described hereinafter.

The switching member 8 is provided under the driving force transmission gear position setting device 7. A switching member main body 81 is supported by a shaft 81a provided at the center thereof such that it may rotate in a horizontal plane. The forked arm 83, extending substantially parallel with the axis of the first worm gear 41, is formed on one side of the switching member main body 81 pin-82 engaging a plunger device 9 protuberantly extends downwardly from the arm portion extending in a direction at about 90 degrees with respect to the direction in which the forked arm 83 extends.

The plunger device 9 is a known device composed of a plunger 91 equipped with a coil spring 93 and a solenoid 92. The plunger 91 moves forwardly or backwardly parallel with the axis of the first worm gear 41 by the electromagnetic induction of the solenoid 92. The solenoid 92 is connected to a plunger driver 210 to receive current.

The proximal circumferential portion of the plunger 91 is provided with a groove in which the pin 82 of the switching member 8 is received. Thus, the switching member main body 81 rotates about the shaft 81a in a horizontal plane as the plunger 91 moves forwardly or backwardly.

Figure 16:
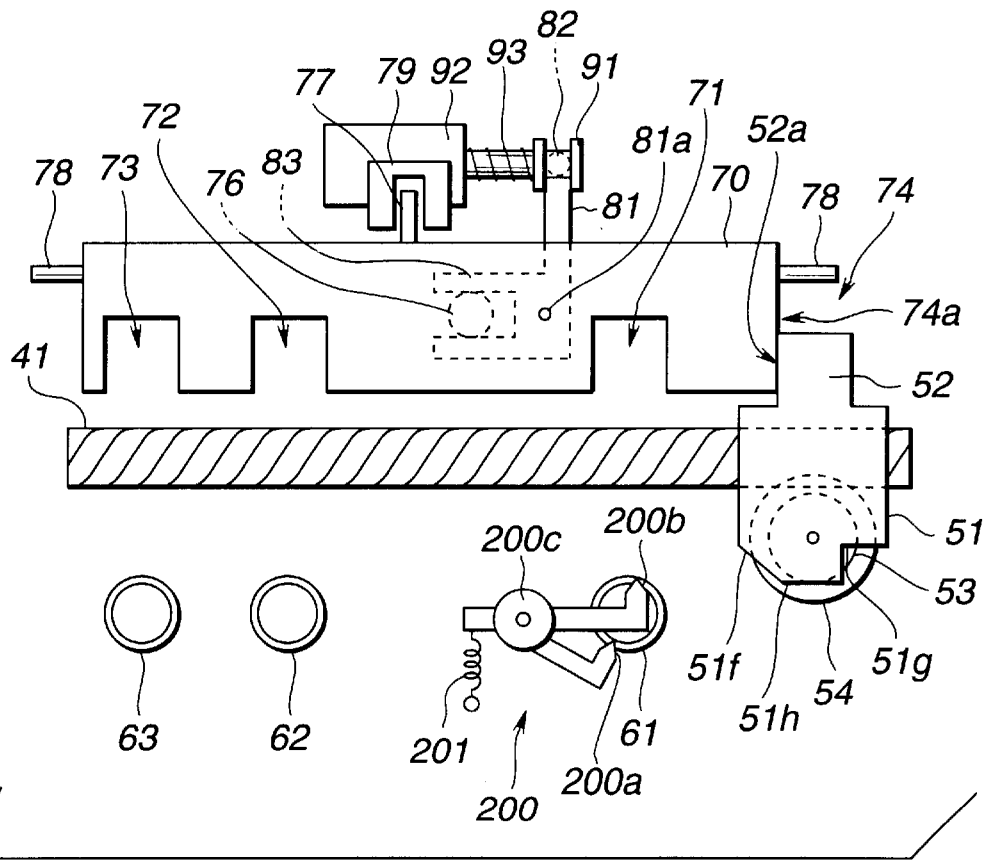
FIG. 16 is a plan view of the driving force transmission gear device, a driving force transmission gear position setting device, a switching member, and a plunger device when the driving force transmission gear device is in an initial position, namely, a fourth position, in the drivingforce transmission switching apparatus of the second embodiment.

Referring now to FIG. 14 and FIG. 16, the driving force transmission gear device 5, the driving force transmission gear position setting device 7, the switching member 8, and the plunger device 9, in an initial state, will be explained.

In the initial state, no current is supplied to the solenoid 92. The plunger 91 is retracted from the solenoid 92, as shown in FIG. 16, by the urging force of the coil spring 93. At this time, the switching member main body 81, having the pin 82 that engages the groove of the plunger 91, is positioned such that the forked arm 83 is parallel with the axis of the first worm gear 41.

The protuberance 76 for controlling rotation received in the arm 83 is oriented downwardly, therefore the switching lock main body 70 is maintained horizontally rather than being rotated by the shaft 78.

The protuberance 77 in the driving force transmission gear position setting device 7 is positioned for interrupting optical signals of the photo interrupter 79, rendering the photo interrupter 79 in an OFF state.

The carrier 51 of the driving force transmission gear device 5 is placed in the fourth position, i.e., the home position. At this time, the side surface 52a of the position setting portion 52 abuts against the side surface 74a of the switching lock main body 70, and a side surface 51e of the carrier 51 opposes a fixing portion 100 of a camera main body with a very small gap therebetween, thereby restricting the movement of the carrier 51.

Naturally, the slant surface 51f of the carrier 51 and the abutting hook 200b are parted.

Figure 17:
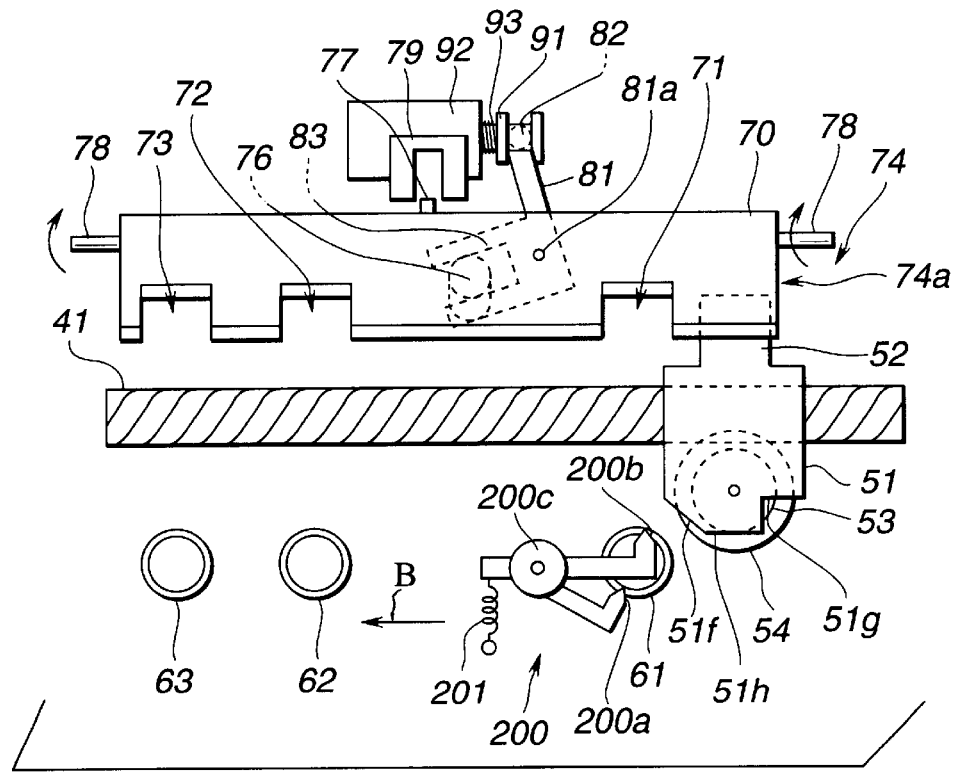
FIG. 17 is a plan view of the driving force transmission gear device, the driving force transmission gear position setting device, the switching member, and the plunger device when the driving force transmission gear device has moved from the initial position to a first position in the driving force transmission switching apparatus of the second embodiment.
Figure 18:
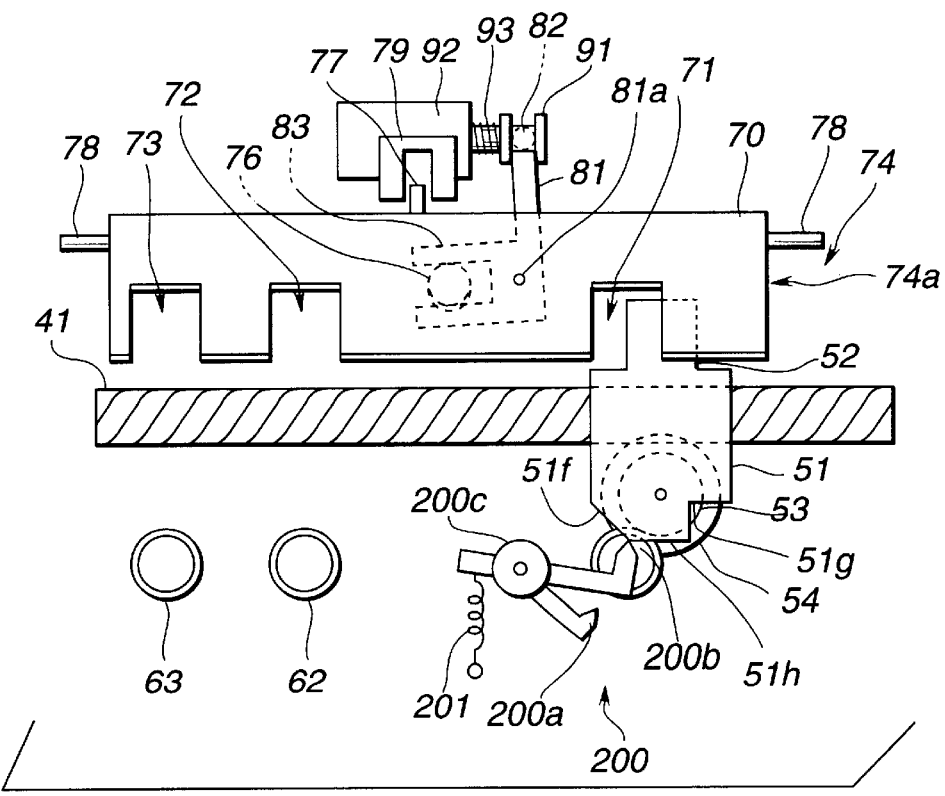
FIG. 18 is a plan view of the driving force transmission gear device, the driving force transmission gear position setting device, the switching member, and the plunger device when the driving force transmission gear device has reached a vicinity of the first position when moving from the initial position to the first position in the driving force transmission switching apparatus of the second embodiment.
Figure 19:
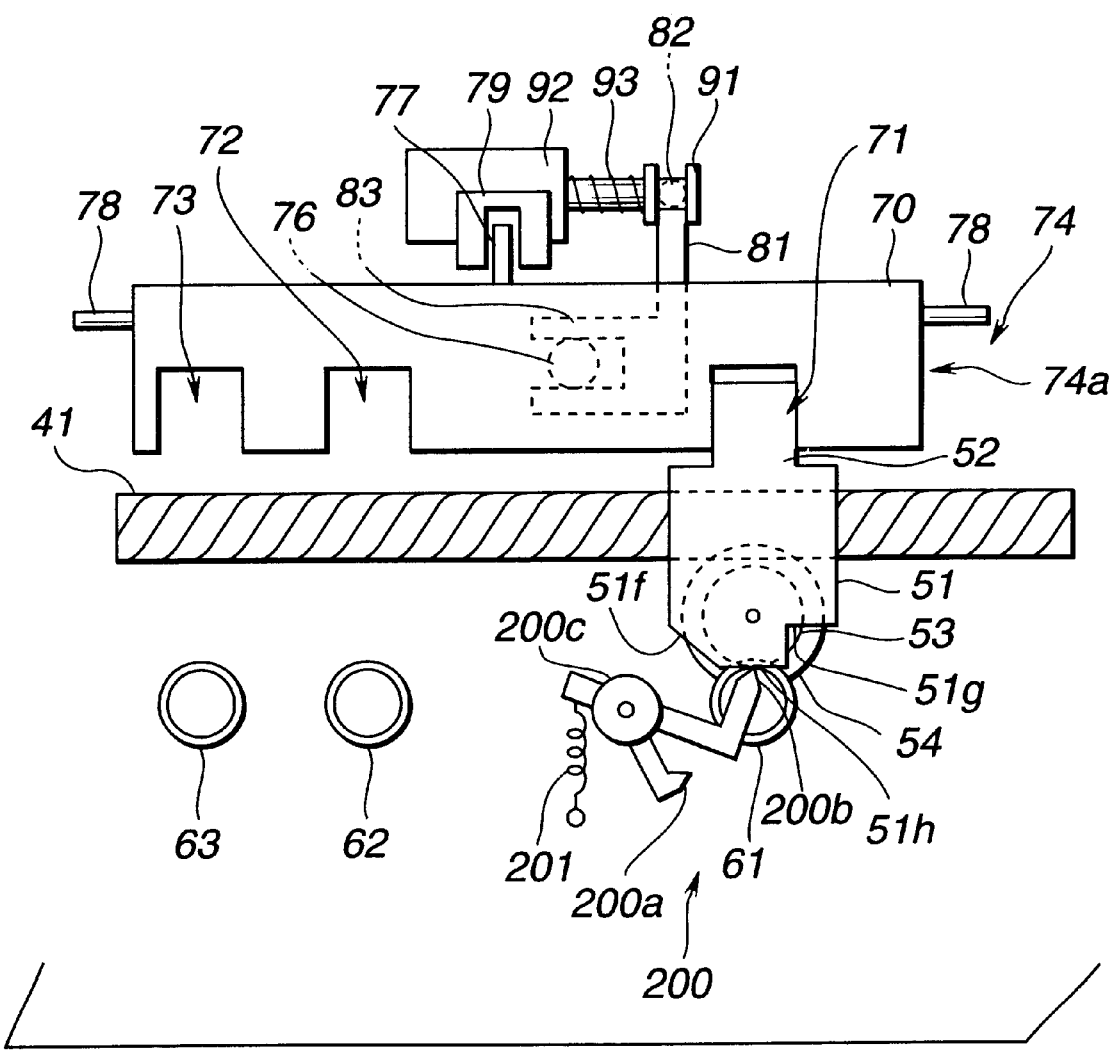
FIG. 19 is a plan view of the driving force transmission gear device, the driving force transmission gear position setting device, the switching member, and the plunger device when the driving force transmission gear device is in the first position in the driving force transmission switching apparatus of the second embodiment.

Referring now to FIG. 17 through FIG. 19, the operations of the foregoing respective devices that are performed when the carrier 51 moves from the initial position or the fourth position (see FIG. 16) to the first position will be described.

To move the carrier 51, first, current is supplied from a plunger driver (not shown) to the solenoid 92. The moment the current is supplied to the solenoid 92, the plunger 91 is drawn into the solenoid 92 against the urging force of the coil spring 93, as shown in FIG. 17. This guides the pin 82 in the same direction, causing the switching member main body 81 to rotate counterclockwise about the shaft 81a.

As the switching member main body 81 rotates, the rotation controlling protuberance 76 received in the forked arm 83 moves upwardly. In other words, the switching lock main body 70 rotates upwardly about the shaft 78. This frees the carrier 51 to move.

When the switching lock main body 70 has moved upwardly, the first worm gear 41 is rotated in a predetermined direction, thereby moving the carrier 51 in a direction B as shown in FIG. 17. FIG. 17 shows the carrier 51 moved due to the rotation of the first worm gear 41. In FIG. 17, the distal end of the position setting portion 52 of the carrier 51 is located under the switching lock main body 70.

The state detecting protuberance 77 retracts from the position for interrupting the optical signals of the photo interrupter 79. This turns the photo interrupter 79 ON.

When the first worm gear 41 is rotated from the state shown in FIG. 17, the carrier 51 moves in the direction B, in FIG. 17. When the position setting portion 52 of the carrier 51 reaches a point in the vicinity of the first position setting portion 71 of the switching lock main body 70, as illustrated in FIG. 18, the supply of current to the solenoid 92 is cut off. The method for detecting whether the position setting portion 52 has reached the point near the first position setting portion 71 will be described hereinafter.

The moment the supply of current to the solenoid 92 is cut off, the plunger 91 moves to the retraction position by the urging force of the coil spring 93. This causes the switching member main body 81 engaging the groove of the plunger 91 with the pin 82, to rotate clockwise about the shaft 81a so that the forked arm 83 is shifted back to the initial state wherein it is parallel with the axis of the first worm gear 41. The rotation controlling protuberance 76 received in the arm 83 also is shifted back downward, causing the switching lock main body 70 to rotate about the shaft 78, thereby returning to the horizontal position.

However, the position setting portion 52 has not yet reached the position where it engages the first position setting portion 71, thus the switching lock main body 70 rests one end thereof on the top surface of the position setting portion 52. This means that the switching lock main body 70 is prepared to return to the initial state as soon as the position setting portion 52 engages the first position setting portion 71.

In FIG. 18, the state detecting protuberance 77 has not yet returned to the position for interrupting the optical signals of the photo interrupter 79, so that the photo interrupter 79 is still ON.

Also, the slant surface 51f and the abutting hook 200b begin to contact and the abutting hook 200b begins to rotate clockwise. This causes the locking hook 200a to disengage from the first driven gear 61. The spur gear 53 and the first driven gear 61 engage before the locking hook 200a disengage from the first driven gear 61.

When the carrier 51 reaches the position where the setting portion 52 engages with the first position setting portion 71, as shown in FIG. 19, the switching lock main body 70 rotates downwardly by the urging force of the coil spring 93 of the plunger device 9, causing the first position setting portion 71 to engage with the position setting portion 52, defining the first position. At this time, the plunger device 9, the switching member 8, and the driving force transmission gear position setting device 7 are in the initial state.

When the carrier 51 reaches the first position, as shown in FIG. 19, the spur gear 53 of the carrier 51 completely meshes with the first driven gear 61. Therefore, when the first worm gear 41 rotates, the driving force of the motor 1 is transmitted to the first driven gear 61 via the spur gear 53. The movement of the carrier 51 is restricted due to the engagement between the first position setting portion 71 and the position setting portion 52, so that the rotational force of the first worm gear 41 only drives the first driven gear 61.

In FIG. 19, the abutting hook 200b reaches the abutting and retaining surface 51h, while the locking hook 200a completely disengages from the first driven gear 61. Thus, a predetermined driving force is transmitted to the first driven gear 61 via the spur gear 53 without interference from the locking hook 200a.

Figure 20:
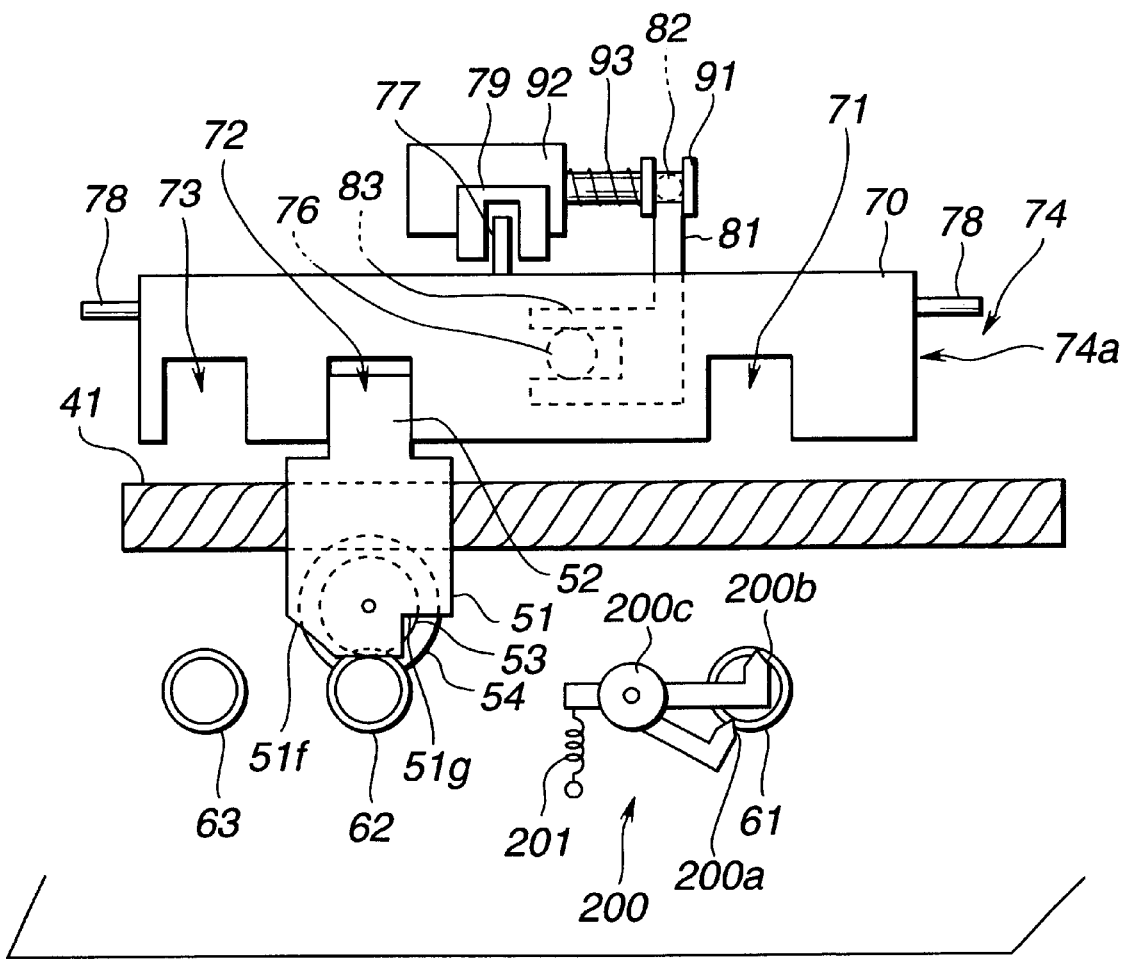
FIG. 20 is a plan view of the driving force transmission gear device, the driving force transmission gear position setting device, the switching member, and the plunger device when the driving force transmission gear device is in the second position in the driving force transmission switching apparatus of the second embodiment.

Subsequently, when the carrier 51 reaches a position illustrated in FIG. 20, the locking hook 200a engages with and locks the first driven gear 61.

The electrical circuit configuration of the driving force transmission switching apparatus of the second embodiment is identical to that of the first embodiment, therefor the description thereof will not be repeated.

Likewise, the moving control method of the carrier 51 in the driving force transmission switching apparatus of the second embodiment is identical to that of FIG. 8, FIG. 9, FIG. 11, and FIG. 13, therefore the description thereof will not be repeated.

In addition, the zooming sequence, the sequence for setting up the lens barrel, and the sequence for opening and closing the film cartridge light-shielding door in the driving force transmission switching apparatus of the second embodiment are identical to those of the first embodiment, therefore the description thereof will be omitted.

In the second embodiment, the carrier can be moved from an arbitrary position to another arbitrary position in an obvious manner, thus detailed descriptions thereof will be omitted.

The driving force transmission switching apparatus of the second embodiment makes it possible to provide a driving force transmission switching apparatus capable of securely locking a driven section, the first driven gear 61, even locking engagement with a driving section, the spur gear 53 in the carrier 51.

The second embodiment includes three driven gears. However the present invention can be applied to a device with more than three driven sections. In such a case, one or more driven sections may be locked or unlocked as previously mentioned.

The concept of the second embodiment can be applied to a device equipped with a plurality of driven sections disposed circumferentially as disclosed in, for example, Japanese Unexamined Patent Publication No. 05-321986, in addition to the device wherein the driven sections are linearly arranged as in the present invention. The circumferentially arranged, driven sections could be locked and unlocked by controlling a member, similar to the locking device 200 in the second embodiment, by means of a member that travels circumferentially.

A third embodiment of the present invention will now be described.

Figure 21:
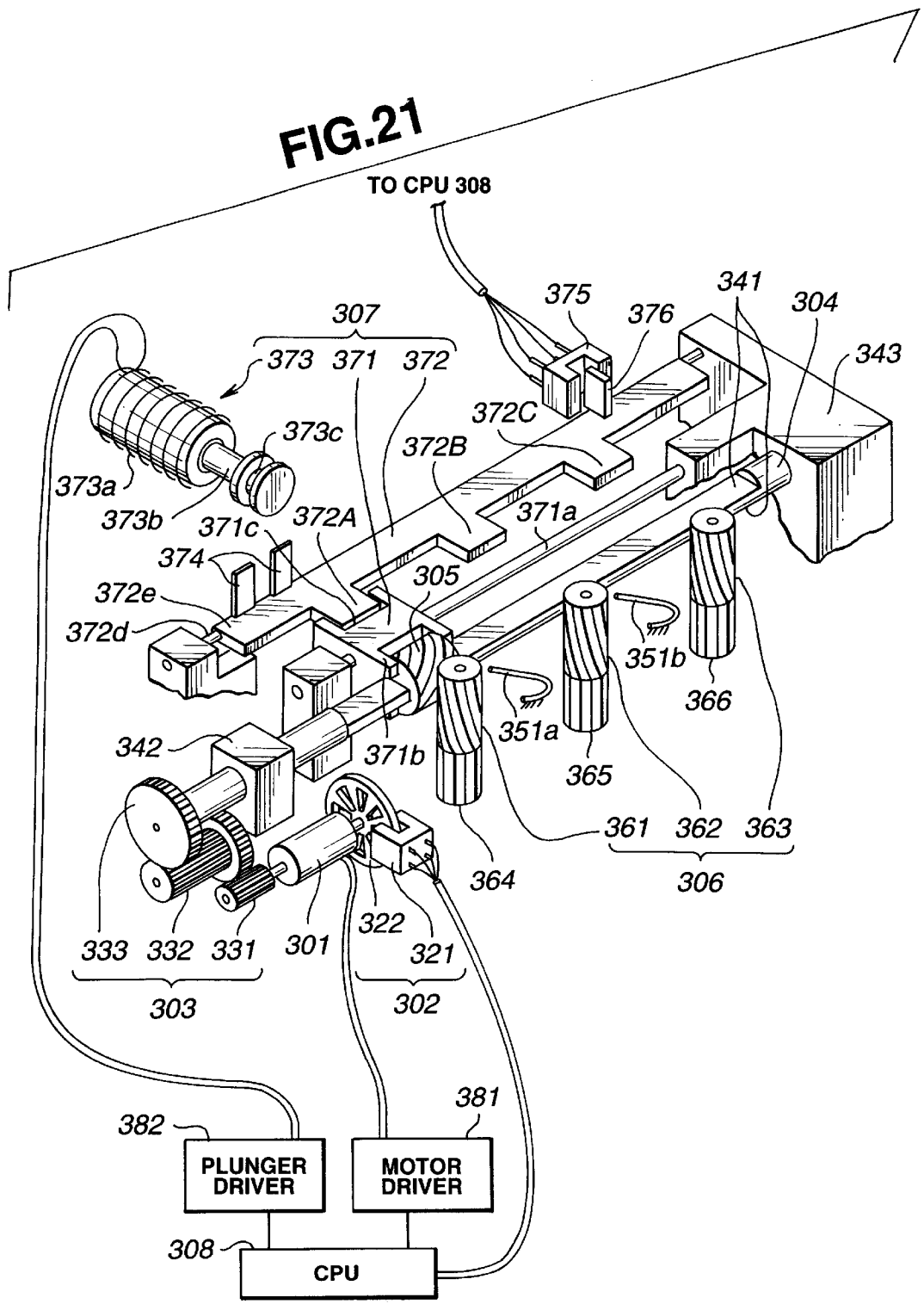
FIG. 21 is an exploded perspective view of a driving force transmission apparatus of a third embodiment of the present invention, wherein a shifting gear is in an initial position.

FIG. 21 is an exploded perspective view of a driving force transmission apparatus of a third embodiment in accordance with the present invention.

Referring to FIG. 21, the driving force transmission apparatus of the third embodiment is equipped with: a motor 301 acting as a drive source of driven devices provided in a camera to which the driving force transmission apparatus is applied; a motor rotational amount detecting device 302 for detecting a rotational amount of the motor 301; a driving force transmission device 303 that transmits a driving force of the motor 301 to a driving shaft 304; a driving shaft 304 that engages the driving force transmission device 303, rotates by the driving force of the motor 301, and transmits power for driving driven gears 306; a moving gear 305 that is provided on the driving shaft 304 and travels linearly, as the driving shaft 304 rotates, between a position for driving the driven gears 306 and a position where it has retracted from the driven gears 306; a plurality of driven gears 306 that are disposed in positions where they are engageable with the moving gear 305 and transmit the driving force of the motor 301 to a predetermined driven system; a moving gear position retaining device 307 that retains the moving gear 305 at a position where it engages with the driven gears 306; and a control device or a central processing unit 308 for controlling the motor 301 and the moving gear position retaining device 307 to cause the moving gear 305 to engage with any one of the driven gears 306.

The motor 301, that can be rotated in both forward and reverse directions, is fixed at a predetermined location in a camera. A pinion gear 331 is provided on an output shaft of the motor 301. The motor 301 serves as a drive source of the driven devices provided in the camera to which the driving force transmission apparatus is applied. The motor 301 is driven by a motor driver 381 under the control of the CPU 308, described in detail hereinafter.

The motor rotational amount detecting device 302 is an encoder for detecting the rotational amount of the motor 301. It is a known detecting device provided integrally with the output shaft of the motor 301, composed of a disc 322 with openings formed along its periphery, and a photo interrupter 321. An output end of the photo interrupter 321 is connected to the CPU 308 so that the rotational amount of the motor 301 can be detected by the CPU 308.

The driving force transmission device 303 includes the pinion gear 331 of the motor 301, a known speed reducer 332 engaging with the pinion gear 331, and an output gear 333 that is a terminal of the speed reducer. The driving force transmission device 303 rotates via the speed reducer at a number of revolutions that is less than that of the motor 301.

The driving shaft 304 is rotatably supported between bearings 342 and 343 that constitute a part of a camera main body. One end of the driving shaft 304 extends through the bearing 342. The output gear 333, which is the terminal of the driving force transmission device 303, is coaxially fixed onto the distal end of the driving shaft 304. Accordingly, the driving shaft 304 is rotated together with the output gear 333 via the driving force transmission device 303 by the driving force of the motor 301.

The driving shaft 304 is columnar and, thus, sections in the vicinity of the bearings are circular. However, the driving shaft 304 has two, parallel D-cut surfaces in the middle portion thereof between the two bearings 342 and 343. Thus, the driving shaft 304 has a hexahedral shape in the portion with the D-cut surfaces 341.

The moving gear 305 is formed by a worm gear capable of engaging with the driven gears 306, discussed hereinafter. The moving gear 305 is slidable in a direction corresponding to the axis and over the middle portion of the driving shaft 304 with the D-cut surfaces 341, and rotatable in a direction corresponding to the driving shaft 304.

The driven gears 306 are constructed by three driven gears, namely, a first driven gear 361, a second driven gear 362, and a third driven gear 363, that are capable of engaging with the moving gear 305. The three driven gears 306 are disposed so that all of their rotating shafts are at right angles to the axis of the driving shaft 304 in a row parallel with the axis of the driving shaft 304.

The first driven gear 361, the second driven gear 362, and the third driven gear 363 are equipped with spur gears 364, 365, and 366, respectively, that coaxially and integrally rotate with the driven gears 361, 362, and 363. The spur gears 364, 365, and 366 respectively constitute a part of predetermined driven systems, namely, a zooming system, a film take-up driving system, and a film rewinding system in the third embodiment.

A moving spring 351a is provided between the first driven gear 361 and the second driven gear 362. A moving spring 351b is provided between the second driven gear 362 and the third driven gear 363. The moving springs 351a and 351b engage with the moving gear 305. These moving springs 351a and 351b are arc spring members, one end of each of being fixed in the camera main body, defining a proximal end portion thereof. The distal ends of the moving springs 351a and 351b are free. These moving springs 351a and 351b are installed in a row parallel with the axis of the driving shaft 304.

The free ends of the moving springs 351a and 351b contact tooth spaces of the moving gear 305 when located among the driven gears 306 while the moving gear 305 is traveling.

A technique for moving the moving gear 305 with the driving shaft 304 will now be described briefly.

The moving gear 305 is a worm gear that is engageable with the three driven gears 306. Assuming that the moving gear 305 is engaged with one of the driven gears 306, when the driving shaft 304 is rotated in a predetermined direction by the motor 301, the moving gear 305 also rotates in the same direction. The rotation of the moving gear 305 causes the driven gear 306 to rotate. As mentioned previously, a predetermined driven system is driven as the driven gear 306 rotates.

When the driven gear 306 is rotated as the moving gear 305 rotates, a reactive force is applied to a tooth of the moving gear 305 that is in contact with a tooth of the driven gear 306. The reactive force causes the moving gear 305 to move in a direction corresponding to the axis of the driving shaft 304. While the moving gear 305 is rotating to transmit power to the driven gear 306, that is, while the moving gear 305 is engaged with the driven gear 306, the moving gear 305 travels along the driving shaft 304.

The moving gear 305 traveling along the driving shaft 304 eventually disengages from the driven gear 306. However, in the driving force transmission apparatus of the third embodiment, the moving springs 351a and 351b urge the moving gear 305 to travel following disengagement. More specifically, immediately before the moving gear 305 disengages from the driven gear 306, after traveling along the driving shaft 304, the distal end or the free end of the moving spring 351a or 351b contacts a predetermined tooth space of the moving gear 305. The moment the free end of the moving spring 351a or 351b contacts the moving gear 305, the moving gear 305 is subjected to a reactive force from the moving spring 351a or 351b produced by the rotation of the moving gear 305 and is urged to travel along the driving shaft 304 as if meshed with the driven gear 306.

The moving springs 351a and 351b are configured to follow the travel of the moving gear 305 as the moving gear 305 travels. The moving springs 351a and 351b and the moving gear 305 are held in contact with each other until the moving gear 305 comes in contact with another driven gear 306.

The axial traveling direction of the moving gear 305 varies according to the direction of rotation of the driving shaft 304. However the relationship between the moving gear 305 and the driven gear 306 and the relationship between the moving gear 305 and the moving springs 351a or 351b remain the same as set forth above.

In the device described above, the moving gear 305 travels axially along the driving shaft 304 as the driving shaft 304 driven by the motor 301 rotates in a predetermined direction. In the third embodiment, the travel of the moving gear 305 is utilized for switching among the three driven gears 306 to which a driving force is to be transmitted. In other words, the third embodiment is equipped with a device for selecting and maintaining engagement between the moving gear 305 and any of the driven gears 306. The selecting and retaining device will now be described below.

In the driving force transmission apparatus of the third embodiment, the moving gear 305 is retained at any of the following three rotational positions:

1st position: The moving gear 305 engages the 1st driven gear 361 (Initial position).

2nd position: The moving gear 305 engages the 2nd driven gear 362.

3rd position: The moving gear 305 engages the 3rd driven gear 363.

Among the positions of the moving gear 305 shown above, the first position, i.e., the home position or the initial position, is the closest to the driving force transmission device 303, the second position and the third position being farther from the first position in this order.

The positions of the moving gear 305 are determined by a moving gear position retaining device 307, which is formed by a moving carrier 371, a moving carrier position control plate 372, etc., described below.

The moving gear position retaining device 307 is formed by: a moving carrier 371, which is able to travel parallel with the driving shaft 304, moves as the moving gear 305 travels, and retains the moving gear 305 in a predetermined position, i.e., a position where it engages with one of the driven gears 306; a moving carrier position control plate 372 that locks or unlocks the moving carrier 371 thereby determining a position where the moving gear 305 engages with one of the driven gears 306; and a plunger device 373 that controls the operation of the moving carrier position control plate 372.

The moving carrier 371 is provided with a retaining arm assembly 371b that freely moves along a guide rod 371a parallel with the driving shaft 304 and axially maintains the moving gear 305 from both ends, and a position setting recess 371c in which a position setting protuberance of the moving carrier position control plate 372 fits.

The retaining arm assembly 371b has a forked arm extending from a proximal end thereof which axially retains the moving gear 305 from both ends. The inner surfaces of the forked arm abut against both end surfaces of the moving gear 305, but do not interfere with the rotation of the moving gear 305. Thus the moving gear 305 can freely rotate. When movement of the moving carrier 371 or the axial movement of the driving shaft 304 is restricted by a technique which will be discussed hereinafter, the retaining arm 371b restricts the movement of the moving gear 305 or the axial movement of the driving shaft 304 so as to retain them in place with the forked arm.

The position setting recess 371c is formed in a proximal portion of the forked arm and has substantially the same shape and size as a position setting protuberance of the moving carrier position control plate 372.

The moving carrier position control plate 372 is a roughly comb-shaped plate member that rotates about a shaft 372d disposed parallel with the driving shaft 304. The moving carrier position control plate 372 has a plurality of position setting protuberances, namely, first through third position setting protuberances 372A, 372B, and 372C, which are on a side opposing the moving carrier 371 and project from a proximal portion 372e extending in a direction corresponding to the axis of the driving shaft 304. The first through third position setting protuberances 372A, 372B, and 372C correspond to the first position (the initial position or the home position), the second position, and the third position, respectively. All of the protuberances have shapes that may be received in or removed from the position setting recess 371c in the moving carrier 371. The width of each position setting protuberance, the width in the axial direction of the driving shaft 304, is substantially identical to the width of the position setting recess 371c so that the movement of the moving carrier 371 or the axial movement of the driving shaft 304 is restricted when any of the position setting protuberances 372A, 372B, and 372C is received in the position setting recess 371c.

The rotation of the moving carrier position control plate 372 is controlled directly by a plunger device 373. To be more specific, the moving carrier position control -plate 372 is rotated by the plunger device 373 to a normal position, or horizontal position, as illustrated in FIG. 21, and a position where it rotates upwardly, e.g. a position illustrated in FIG. 23 or FIG. 24.

The moving carrier position control plate 372 only rotates about a shaft 372d and does not move in a direction corresponding to the axis of the driving shaft 304.

The movement of the moving carrier 371 in the axial direction of the driving shaft 304 is restricted by one of the position setting protuberances received in the position setting recess 371c. This also restricts the movement of the moving gear 305 along the driving shaft 304. More specifically, even when the moving gear 305 rotates together with the driving shaft 304 and the moving gear 305 is urged to move along the driving shaft 304 as mentioned above, the movement of the moving gear 305 is restricted by the moving carrier 371 locked by one of the first through third position setting protuberances 372A through 372C. Thus, the lateral position of the moving gear 305 is retained.

The driving force transmitting apparatus of the third embodiment makes use of the lateral position retaining operation for switching the driving force transmission position of the driven gears 306. More specifically, the movement of the moving carrier 371 is restricted in accordance with a timing at which the moving gear 305 engages with one of the driven gears 306 thereby restricting the movement of the moving gear 305 and also retaining the moving gear 305 in that position. In the third embodiment, the first, second, and third position setting protuberances 372A, 372B, and 372C are formed in positions opposite to the first driven gear 361, the second driven gear 362, and the third driven gear 363, respectively. For instance, the first position setting protuberance 372A is provided in a position opposing the first driven gear 361. Thus, the position setting protuberance 372A fits in the position setting recess 371c of the moving carrier 371 where the moving gear 305 properly engages with the first driven gear 361, thereby restricting the movement of the moving carrier 371 and retaining the lateral position of the moving gear 305.

A lateral control device of the moving carrier position control plate 372 will now be described.

A forked arm assembly 374 that projects from a plate surface extends vertically from one end of the moving carrier position control plate 372. The plunger device 373 is disposed in the vicinity of the arm assembly 374. The plunger device 373 is a known device composed of a solenoid 373a and a plunger pin 373b equipped with a coil spring (not shown). The plunger pin 373b moves forwardly and backwardly at right angles to a direction corresponding to the axis of the driving shaft 304 by electromagnetic induction of the solenoid 373a. The solenoid 373a is connected to a plunger driver 382 to receive current supplied under control by a CPU 308. The coil spring urges the plunger pin 373b outwardly.

A circumferential groove 73c is provided at a proximal end portion of the plunger pin 373b. The arm assembly 374 of the moving carrier position control plate 372 engages the groove 73c. As shown, the plunger device 373 and the arm assembly 374 are parted. The arm assembly 374 or the moving carrier position control plate 372 rotates about the shaft 372d as the plunger pin 373b moves forwardly or backwardly.

When the plunger device 373 is turned ON under the control of the CPU 308, the plunger pin 373b is drawn into the solenoid 373a against the urging force of the coil spring, causing the moving carrier position control plate 372 to rotate upwardly. When the plunger device 373 is turned OFF, the plunger pin 373b is pushed out of the solenoid 373a with the urging force of the coil spring, so that the moving carrier control plate 372 returns to the horizontal position or normal position.

The other end of the moving carrier position control plate 372 is provided with a protuberance 376, for detecting a rotational state thereof that projects from a plate surface. The protuberance 376 together with the photo interrupter 375 constitute a device for detecting a rotational state as rotated by the plunger device 373. An output terminal of the photo interrupter 375 is connected to the CPU 308 for sensing the state of the moving carrier position control plate 372.

Electrical elements in the driving force transmission apparatus of the third embodiment will now be described with reference to FIG. 22.

Figure 22:
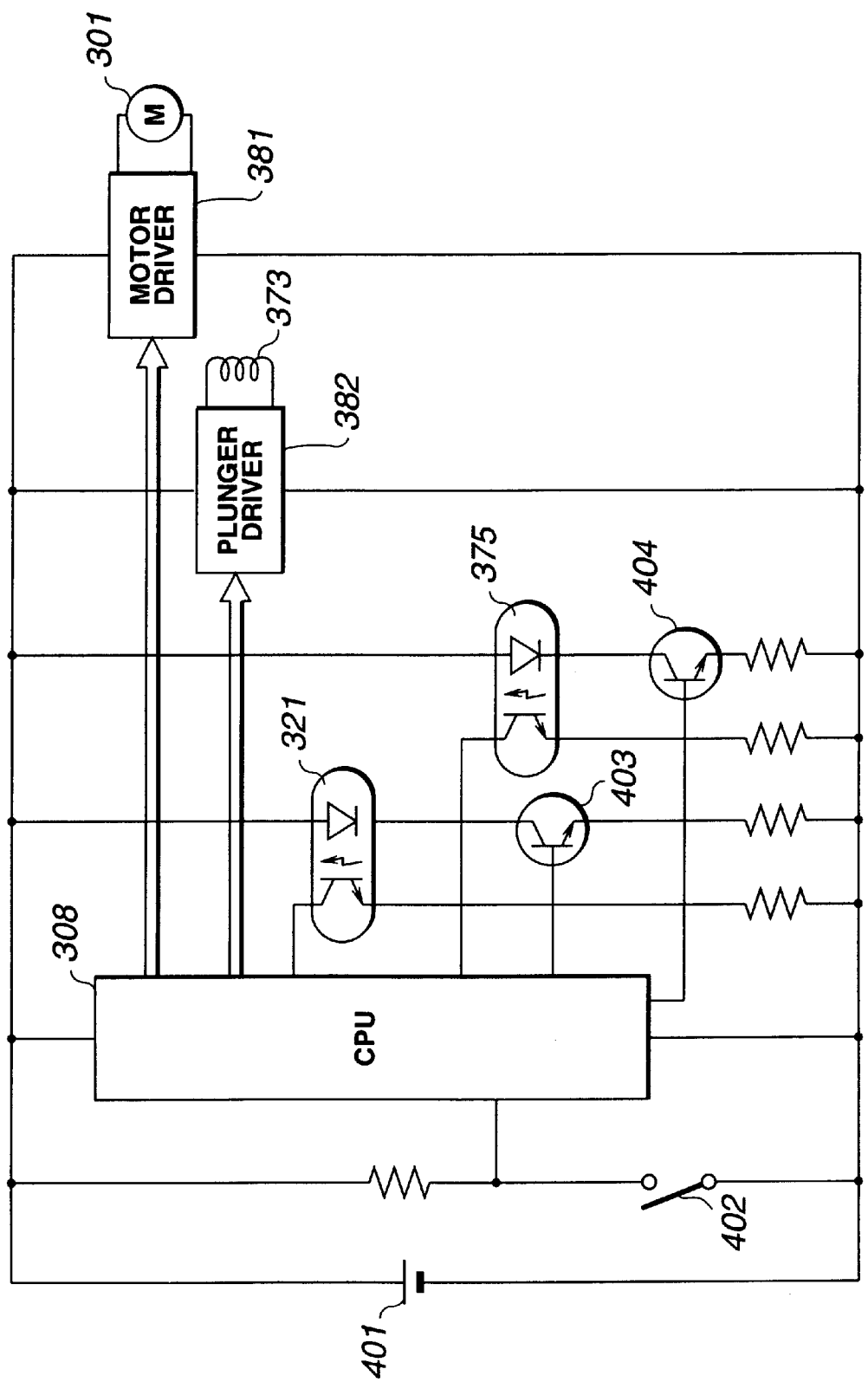
FIG. 22 is a circuit diagram showing an electrical configuration of the driving force transmission apparatus of the third embodiment.

FIG. 22 is a block diagram showing electrical elements in the driving force transmission apparatus of the third embodiment. The camera is equipped with diverse electric circuits in addition to the composing elements illustrated. However only the elements necessary for describing the third embodiment will be referred to, the descriptions of other circuits, etc. being omitted.

The camera is equipped with the control device (CPU) 308 that controls the entire camera, a battery 401 serving as a power supply for the electric circuits, etc., and a power switch 402 for turning the CPU 308 on and off.

As previously mentioned, a motor driver 381 for driving the motor 301, a plunger driver 382 for driving the plunger device 373, the photo interrupter 321 for detecting a rotational amount of the motor 301, and the photo interrupter 375 for detecting a rotational state of the moving carrier position control plate 372 are connected to the CPU 308, and the CPU 308 controls all the circuits. Light emission of LEDs of the photo interrupters 321 and 375 is controlled by drive transistors 403 and 404 which are controlled by the CPU 308.

When power is supplied to the CPU 308 by turning the power switch 402 ON, the CPU 308 starts controlling diverse electric circuits, etc. The following will describe major control in accordance with the third embodiment.

The CPU 308 drives the motor 301 via the motor driver 381 and also detects the rotational amount of the motor 301 on the basis of pulsed output signals from the photo interrupter 321 in the motor rotational amount detecting device 302. As previously mentioned, the driving shaft 304, the moving gear 305, etc. are driven as the motor 301 rotates. The CPU 308 calculates a position of the moving gear 305 or a position of a moving carrier 371 on the basis of the rotational amount of the motor 301 to control the position of the moving gear 305.

To drive a predetermined driven gear 306, the CPU 308 drives the motor 301 via the motor driver 381 as necessary.

The CPU 308 controls the plunger device 373 via the plunger driver 382. As mentioned above, the plunger device 373 rotates the moving carrier position control plate 372 so as to restrict or release the movement of the moving carrier 371. To restrict the movement of the moving carrier 371, the CPU 308 refers to positional information regarding the moving gear 305 acquired, as mentioned above, and also to the rotational state of the moving carrier position control plate 372 recognized from output signals from the photo interrupter 375.

Referring now to FIG. 23 through FIG. 27 and the flow charts of FIG. 28 and FIG. 29, a sequence for selecting one of the driven gears 306 and a driving force transmitting sequence in the driving force transmission apparatus of the third embodiment will be described.

FIG. 23 through FIG. 27 to show the sequence for selecting one of the driven gears 306 and the driving force transmitting sequence in the driving force transmission apparatus of the third embodiment FIGS. 23–27 are exploded perspective views of the operation of the moving gear 305, the moving carrier 371, and the moving carrier position control plate 372. FIG. 28 illustrates a sequence for selecting the first driving system, namely, the zooming system, and a sequence for transmitting a driving force in the driving force transmission apparatus of the third embodiment. Likewise, FIG. 29 illustrates a sequence for selecting the second driving system, namely, a driving system other than the zooming system, and a sequence for transmitting a driving force.

Figure 28:
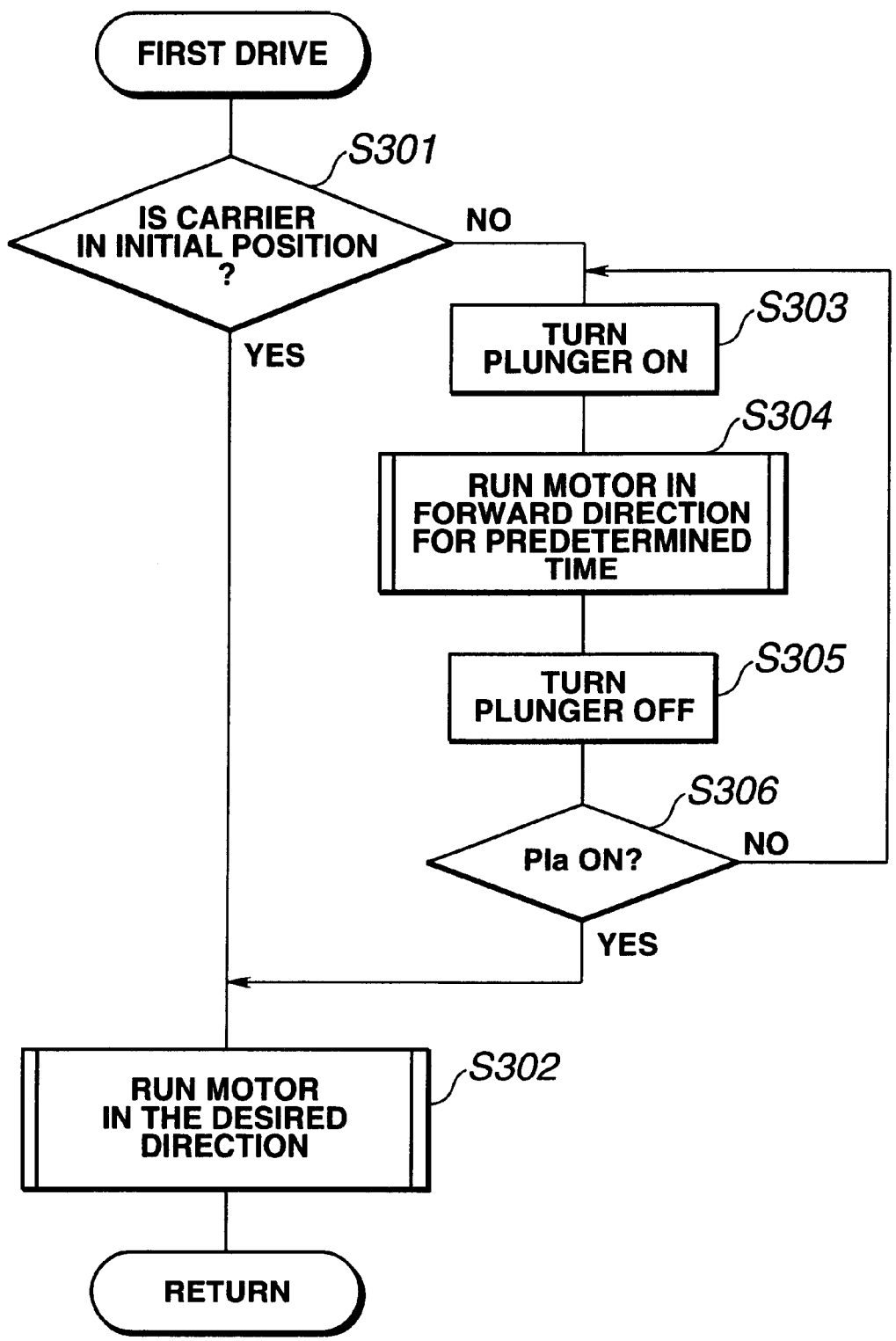
FIG. 28 is a flow chart illustrating an operation for selecting a first drive system (zooming drive system) and for transmitting a driving force thereto in the driving force transmission apparatus of the third embodiment.

Referring to FIG. 28, a first selecting sequence and the driving force transmitting sequence for selecting and driving the first driving system, namely, the zooming system, will be described. To drive the first driving system, the moving gear 305 is set in the first position where it engages with the first driven gear 361, as mentioned above.

As shown in FIG. 28, the CPU 308 first determines whether the moving carrier 371 or the moving gear 305 is in the initial position or the first position (step S301). If the moving gear 305 is in the first position or the initial position where it engages with the first driven gear 361 or the zooming system as shown in FIG. 21, the CPU 308 proceeds from step S301 to step S302 to implement a subroutine for running the motor 301. In step S302, the CPU 308 rotationally drives the motor 301 in a desired direction.

Figure 26:
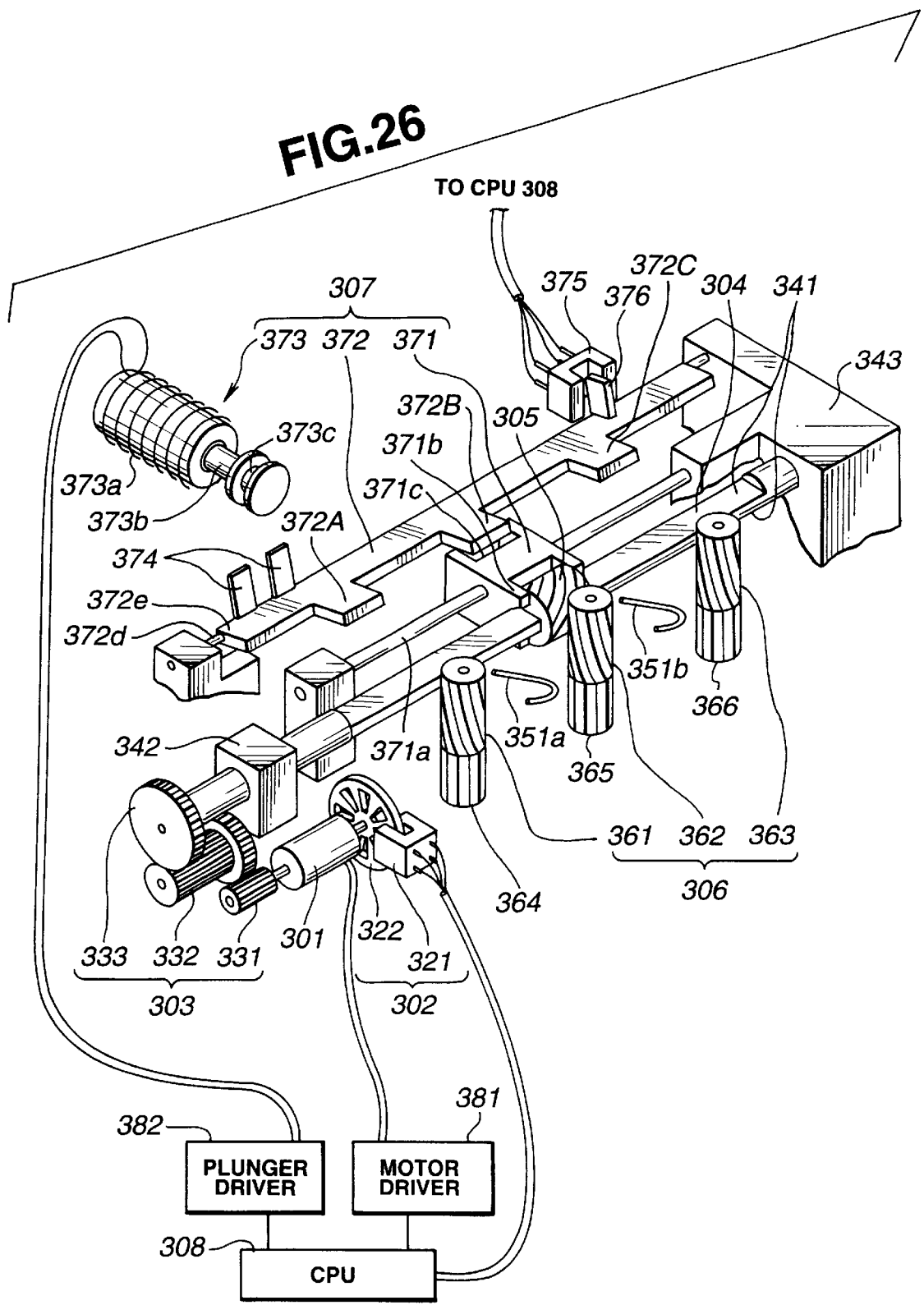
FIG. 26 is a further exploded perspective view of the driven gear selecting operation and the driving force transmitting operation in the driving force transmission apparatus of the third embodiment.
Figure 27:
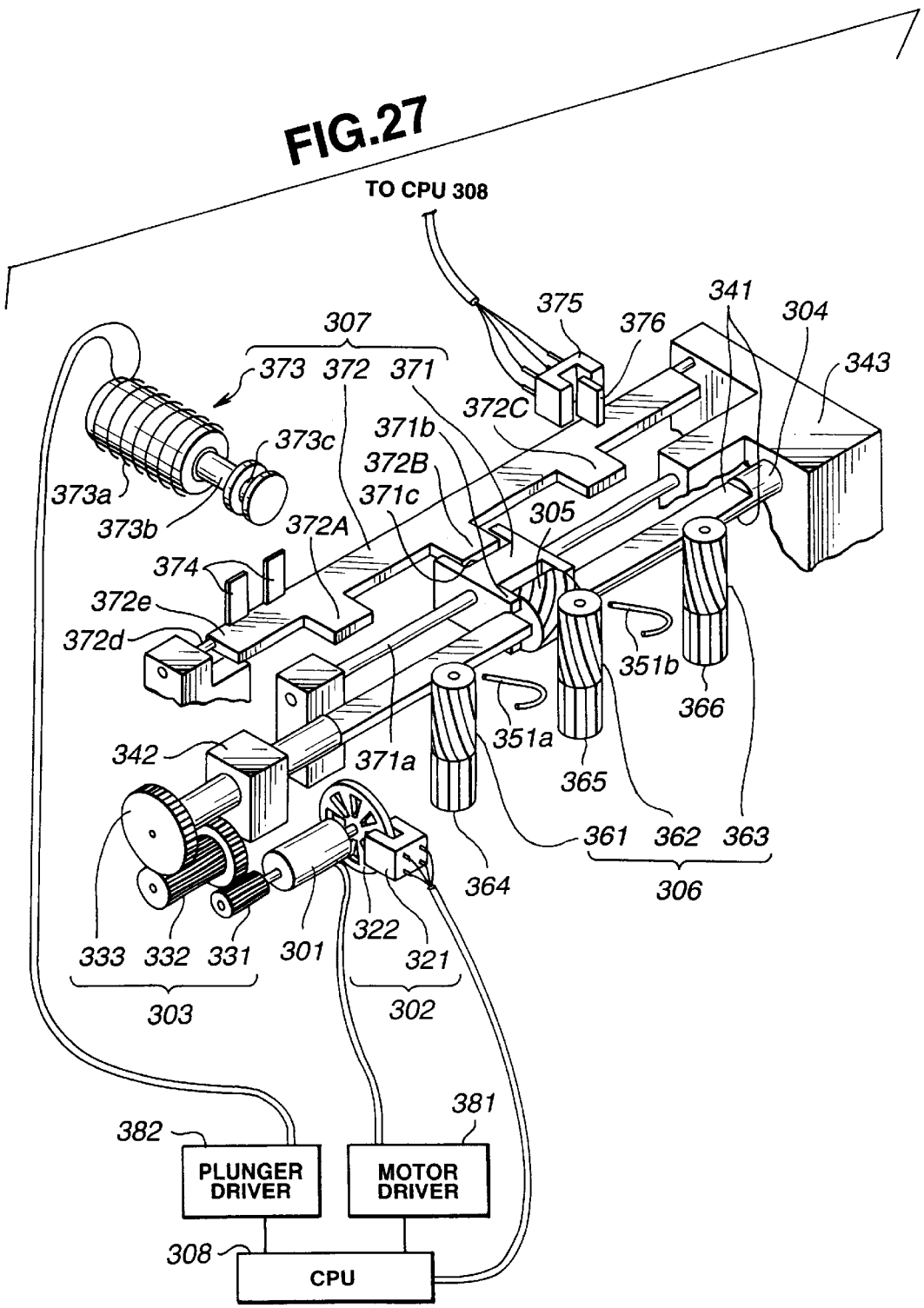
FIG. 27 is still another exploded perspective view of the driven gear selecting operation and the driving force transmitting operation in the driving force transmission apparatus of the third embodiment.

If the CPU 308 finds in step S301 that the moving gear 305 is not in the first position or the initial position, e.g. if the moving gear 305 is in the second position where it engages with the second driven gear 362, then the CPU 308 executes steps S303–S306 so as to return the moving gear 305 to the first position. If the moving gear 305 is in the second position as illustrated in FIG. 27, the CPU 308 first turns the plunger device 373 ON (step S303). This causes the plunger pin 373b to be drawn into the solenoid 373a, and the moving carrier position control plate 372 accordingly rotates upwardly as illustrated in FIG. 26. Thus, the moving carrier 371 is unlocked and free to move.

Figure 23:
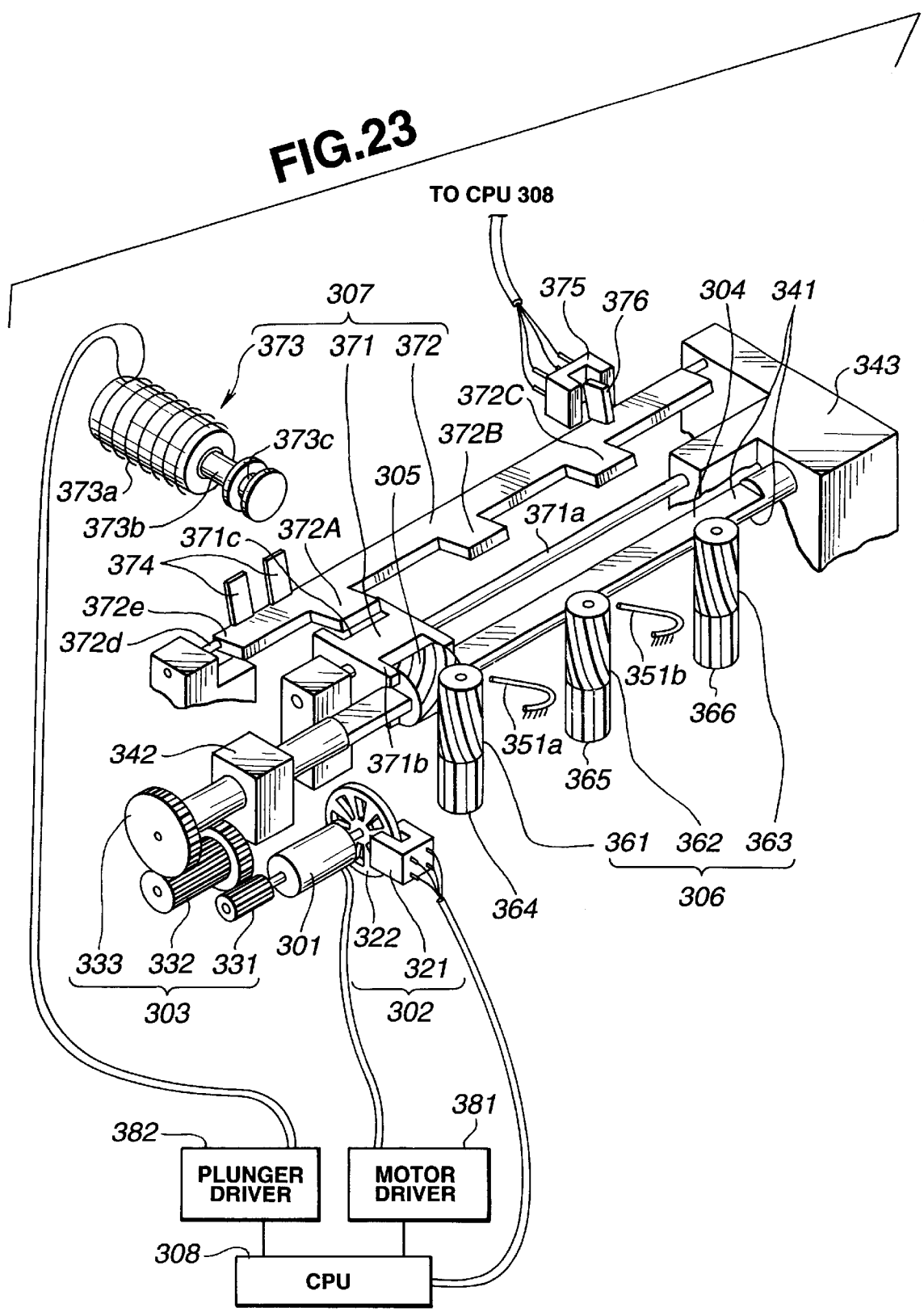
FIG. 23 is an exploded perspective view of a driven gear selecting operation and a driving force transmitting operation in driving force transmission apparatus of the third embodiment.
Figure 24:
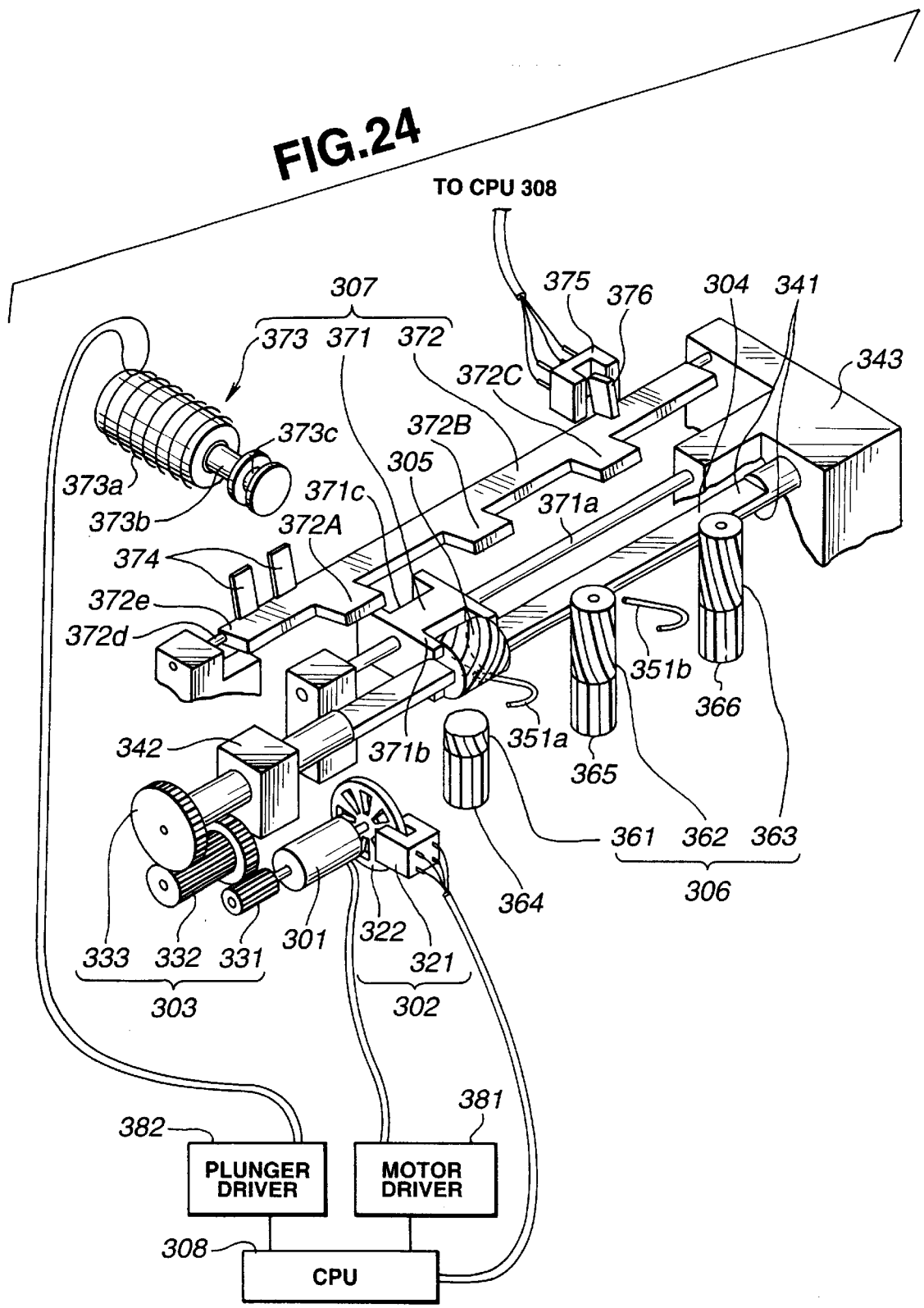
FIG. 24 is another exploded perspective view of the driven gear -selecting operation and the driving force transmitting operation in the driving force transmission apparatus of the third embodiment.
Figure 25:
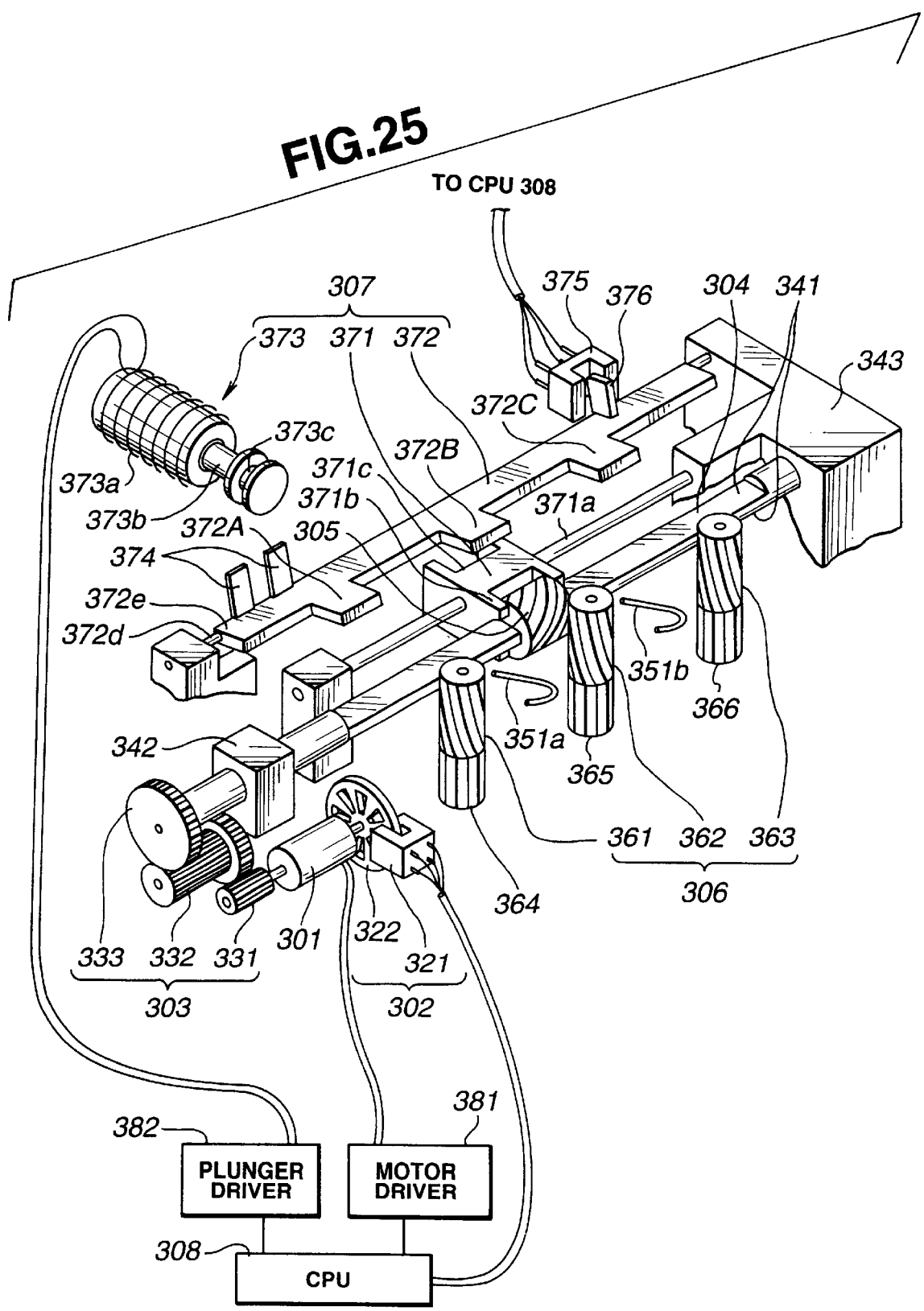
FIG. 25 is yet another exploded perspective view of the driven gear selecting operation and the driving force transmitting operation in the driving force transmission apparatus of the third embodiment.

The CPU 308 then runs the motor 301 in the forward direction for a predetermined time (step S304). As the motor 301 runs in the forward direction, the moving gear 305 moves toward the first position. More specifically, the moving gear 305 moves as shown in FIG. 25, FIG. 24, and FIG. 23 in this order from the position shown in FIG. 26. The predetermined time corresponds to the rotational amount of the motor 301 required for the moving gear 305 to move from the second position to the first position. At this time, the CPU 308 detects the rotational amount of the motor 301 from pulsed signals from the photo interrupter 321 as mentioned above.

When the CPU 308 completes running the motor 301 for the predetermined time, the moving gear 305 will be located in the first position as shown in FIG. 23. Then, the CPU 308 turns the plunger device 373 OFF to return the moving carrier position control plate 372 to the normal position (step S305).

When the CPU 308 confirms from an output signal PIa of the photo interrupter 375 that the moving carrier position control plate 372 has returned to the normal position or the horizontal position (step S306), it decides that the moving gear 305 is retained at the first position, and executes the foregoing step S302 which is the subroutine for running the motor 301.

Figure 29:
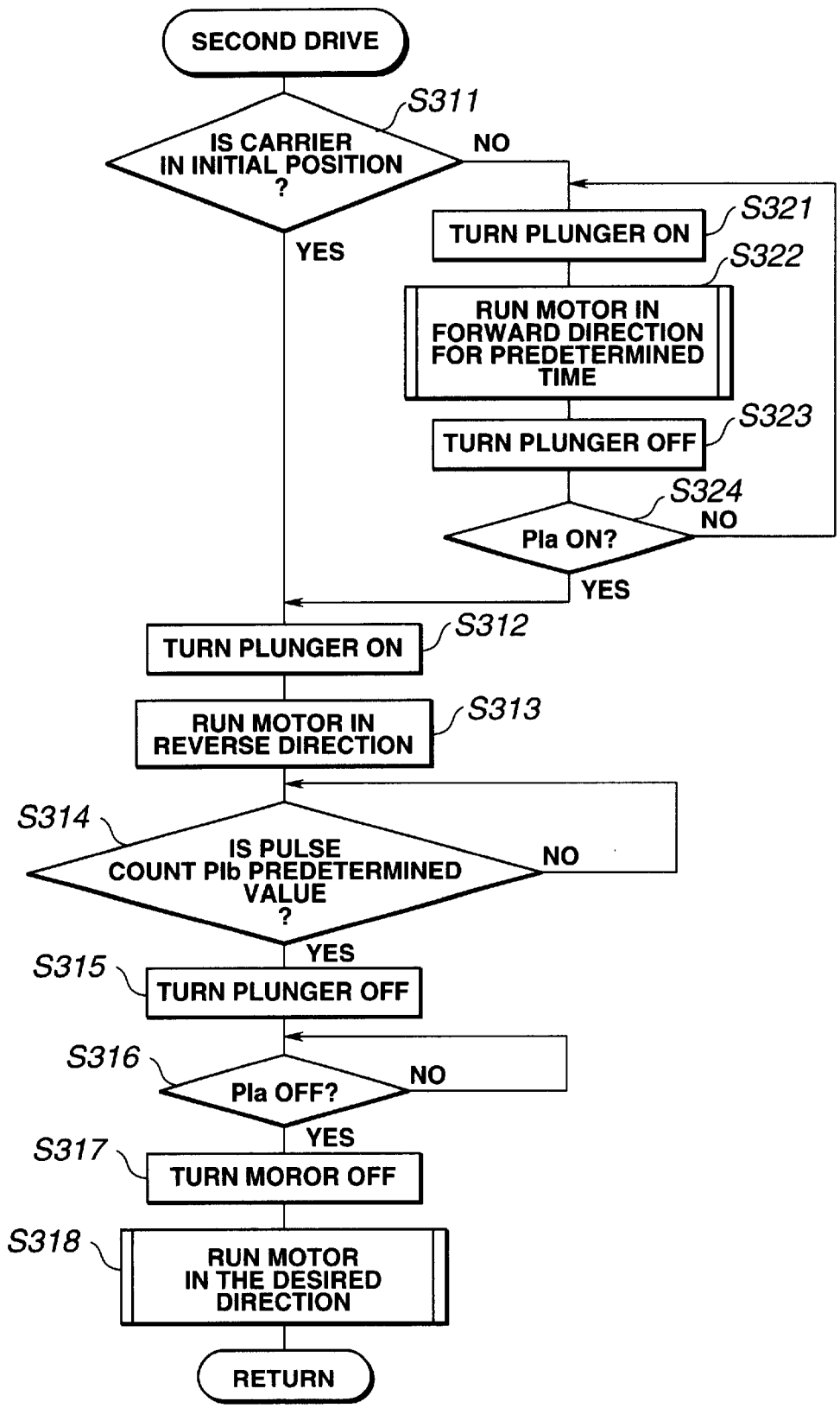
FIG. 29 is a flow chart illustrating an operation for selecting a second drive system (a drive system other than the zooming drive system) and for transmitting a driving force thereto in the driving force transmission apparatus of the third embodiment.

Referring now to FIG. 29, the sequence for selecting and driving the second driving system, i.e., a driving system other than the zooming system, and the sequence for transmitting a driving force will be described. The second driving system is either a film takeup system associated with the second driven gear 362 or a film rewinding system associated with the third driven gear 363.

Referring to FIG. 29, the CPU 308 first determines whether the moving carrier 371 or the moving gear 305 is in the initial position or the first position (step S311). If the moving gear 305 is in the first position or the initial position as shown in FIG. 21, then the CPU 308 proceeds from step S311 to step S312 to cause the moving gear 305 to engage with the desired driven gear 306, namely, the second driven gear 362 or the third driven gear 363.

In step S312, the CPU 308 turns the plunger device 373 ON. This causes the plunger pin 373b to move into the solenoid 373a, and the moving carrier position control plate 372 accordingly rotates upwardly, as illustrated in FIG. 23. Thus, the moving carrier 371 is unlocked.

The CPU 308 then rotates the motor 301 in the reverse direction (step S313). Running the motor 301 in the reverse direction causes the moving gear 305 to move from the first position toward the second position or the third position. More specifically, the moving gear 305 moves as shown in FIG. 24, FIG. 25, and FIG. 26 in this order from the position shown in FIG. 23.

The CPU 308 counts the pulse signals PIb from the photo interrupter 321 and moves the moving gear 305 until the rotational amount of the motor 301 reaches a predetermined amount (step S314). The predetermined amount corresponds to the rotational amount of the motor 301 required for the moving gear 305 to move to the second position or the third position.

When the CPU 308 rotates the motor 301 for the predetermined amount in step S314, the moving gear 305 will be located in the desired position, the second position in this case, as shown in FIG. 26. Then, the CPU 308 turns the plunger device 373 OFF to return the moving carrier position control plate 372 to the normal position (step S315).

When the CPU 308 confirms from the output signal Pia of the photo interrupter 375 that the moving carrier position control plate 372 has returned to the normal position or the horizontal position (step S316), it decides that the moving gear 305 is being retained at the second position, and turns the motor 301 OFF (step S317) before it executes the subroutine for running the motor 301 (step Sale). To be more specific, the CPU 308 rotationally drives the motor 301 in a desired direction to drive the second driven gear 362 as necessary.

If the CPU 308 finds in the foregoing step S311 that the moving gear 305 is not in the initial position, e.g. if the moving gear 305 is in the second position where it engages the second driven gear 362, then the CPU 308 first executes steps S321–S324 so as to bring the moving gear 305 back to the first position.

If the moving gear 305 is in the second position as illustrated in FIG. 27, the CPU 308 turns the plunger device 373 ON (step S321) and runs the motor 301 in the forward direction for a predetermined time (step S322). When the motor 301 has run for the predetermined time, the CPU 308 turns the plunger device 373 OFF (step S323), confirms that the moving carrier position control plate 372 has returned to the normal position or the horizontal position (step S324), and implements steps S312–S318.

The CPU 308 carries out the same control as that illustrated in FIG. 29 to move the moving gear 305 to the third position, i.e. the position where the moving gear 305 engages with the third driven gear 363.

In the third embodiment, the moving gear 305 is returned to the first position or the initial position before it is moved to a desired position. It is possible, however, also to move the moving gear 305 from an arbitrary position to another arbitrary position, as described above.

Thus, the driving force transmission apparatus of the third embodiment makes it possible to provide a smaller sized driving force transmission apparatus capable of switching among a plurality of objects to which a driving force is to be transmitted.

In this invention, it is apparent that working modes different in a wide range can be formed on this basis of this invention without departing from the spirit and scope of the invention. This invention is not restricted by any specific embodiment except being limited by the appended claims.

What is claimed is:

1. A driving force transmission switching apparatus for a camera, comprising:
   a drive source which generates a driving force;
   a worm gear which receives said driving force to rotate;
   a driving force transmission gear device which includes a driving gear and meshes said driving gear with said worm gear to move said driving gear parallel with a direction corresponding to an axis of said worm gear as said worm gear rotates so as to shift said driving gear between a plurality of transmission positions for applying a driving force of said drive source and a non-transmission position for not applying the driving force of said drive source;
   a plurality of driven gears which are disposed in positions for meshing with said driving gear, respectively corresponding to said plural transmission positions where said driving gear is to be set, and which receive the driving force of said drive source via said driving gear; and
   a position control means for conducting control by meshing said driving force transmission gear device with said worm gear to move said driving force transmission gear device parallel with the direction corresponding to the axis of said worm gear as said worm gear rotates so as to shift said driving force transmission gear device between the plurality of transmission positions for applying the driving force of said drive source and the non-transmission position for not applying the driving force of said drive source.

2. A driving force transmission switching apparatus for a camera according to claim 1, wherein said driving force transmission gear device further comprises a movable support member which rotatably supports said driving gear and is capable of being moved in a direction corresponding to a rotational axis of said worm gear.

3. A driving force transmission switching apparatus for a camera according to claim 2, wherein said driving force transmission gear device further comprises a shaft member parallel with said worm gear to move said movable support member parallel with said worm gear.

4. A driving force transmission switching apparatus for a camera according to claim 1, further comprising:
   a locking member which is provided for an arbitrary driven gear or an arbitrary number of driven gears among said plural driven gears, and engages with said driven gear or gears to prevent rotation of said driven gear or gears when said driving force transmission gear is not engaged with said driven gear or gears, while it disengages from said driven gear or gears by the driving force of said drive source when said driving force transmission gear is to engage with said driven gear or gears.

5. A driving force transmission switching apparatus for a camera, comprising:
   a drive source which generates a driving force;
   a worm gear which receives said driving force to rotate;
   a driving force transmission gear which engages with said worm gear to move parallel with a direction corresponding to an axis of said worm gear as said worm gear rotates so as to be set at a transmission position for applying the driving force of said drive source;
   a driven gear that engages with said driving force transmission gear when said driving force transmission gear is set at said transmission position so as to receive the driving force of said drive source via said driving force transmission gear; and
   a locking member which engages with said driven gear to prevent rotation of said driven gear when said driving force transmission gear is not engaged with said driven gear, while said locking member disengages from said driven gear when said driving force transmission gear is engaged with said driven gear.

6. A driving force transmission switching apparatus for a camera according to claim 5, wherein said driven gear includes a spur gear.

7. A driving force transmission switching apparatus for a camera according to claim 5, further comprising a plurality of said driven gears at a plurality of locations.

8. A driving force transmission switching apparatus for a camera according to claim 6, wherein said driving force transmission gear is formed by a helical gear, which engages with said worm gear, and a spur gear provided coaxially and integrally with said helical gear.

9. A driving force transmission switching apparatus for a camera, comprising:
   a rotating shaft member which has a worm gear extended over a predetermined length, and receives a driving force from a drive source to rotate;
   a moving member which has a driving force transmission gear engaging with said worm gear, and is capable of being moved in a direction corresponding to an axis of said rotating shaft member by a driving force from said rotating shaft member;

a driven gear to which a driving force from said driving force transmission gear is transmitted;

a setting means for setting a position of said moving member with respect to said rotating shaft member; and a locking member which engages with said driven gear to prevent rotation of said driven gear when said driving force transmission gear is not engaged with said driven gear, while it disengages from said driven gear when said driving force transmission gear is engaged with said driven gear.

10. A driving force transmission switching apparatus for a camera according to claim 9, further comprising a frictional urging member installed between said moving member and said driving force transmission gear.

11. A driving force transmission switching apparatus for a camera according to claim 9, wherein said driven gear is a spur gear, said driving force transmission gear is a helical gear, and said moving member includes a spur gear that rotates together with said helical gear and engages with said driven gear.

12. A driving force transmission switching apparatus for a camera according to claim 9, wherein said setting means comprises:

a detecting means for detecting a movement amount of said moving member; and a movement locking member that can be set at a retracted position where said movement locking member has been retracted from a movement path of said moving member so as to allow said moving member to move, and an advanced position where said movement locking member has entered the movement path of said moving member so as to prevent movement of said moving member, according to an output of said movement detecting means.

13. A driving force transmission switching apparatus for a camera according to claim 12, wherein said movement locking member engages with said moving member in said advanced position to prevent movement of said moving member.

14. A driving force transmission switching apparatus for a camera according to claim 12, wherein said detecting means includes a photo interrupter.

15. A driving force transmission switching apparatus for a camera, comprising:

a single motor;

a worm gear rotated by said motor;

a driving force transmission gear which engages with said worm gear and is capable of moving parallel with a direction corresponding to an axis of said worm gear as said worm gear rotates;

a driven gear which is capable of engaging with said driving force transmission gear and receiving a driving force of said motor; and a locking member which engages with said driven gear to prevent rotation of said driven gear when said driving force transmission gear is not engaged with said driven gear, while it disengages from said driven gear when said driving force transmission gear is engaged with said driven gear.

16. A driving force transmission switching apparatus for a camera according to claim 15, wherein said driving force transmission gear includes a helical gear that is always engaged with said worm gear.

17. A driving force transmission switching apparatus for a camera, comprising:

a driven means;

a single drive source for driving said driven means;

a linear movement driving means which linearly moves away from or meshes with said driven means by a driving force of said drive source, and drives said driven means by the driving force of said drive source when it meshes with said driven means; and a locking means that allows said driven means to be driven by linear movement of said movement driving means when said movement driving means drives said driven means, while it locks said driven means by retracting said movement driving means when said movement driving means does not drive said driven means.

18. A driving force transmission switching apparatus for a camera, comprising:

a driven means;

a single drive source for driving said driven means;

a driving means other than a motor for transmitting a driving force of said single drive source to said driven means;

a linear movement means for linearly moving said driving means with the driving force of said single drive source to a position where said driven means is disposed;

an operation prohibiting means for prohibiting operation of said driven means when a driving force from said driving means is not being transmitted to said driven means; and a releasing means for releasing said operation prohibiting means to allow the driving force from said driving means to be transmitted to said driven means when said driving means is moved by said linear movement means to the position where said driven means is disposed.

19. A driving force transmission switching apparatus for optical equipment, comprising:

a drive source which generates a driving force;

a worm gear which receives said driving force to rotate;

a driving force transmission gear device which includes a driving gear and meshes said driving gear with said worm gear to move said driving gear parallel with a direction corresponding to an axis of said worm gear as said worm gear rotates so as to shift said driving gear to one of a plurality of transmission positions for applying a driving force of said drive source and a non-transmission position for not applying the driving force of said drive source;

a plurality of driven gears which are disposed in positions for meshing with said driving gear, respectively corresponding to said plural transmission positions where said driving gear is to be set, and which receive a driving force of said drive source via said driving gear; and a position control means for conducting control by meshing said driving force transmission gear device with said worm gear to move said driving force transmission gear device parallel with the direction corresponding to the axis of said worm gear as said worm gear rotates so as to shift said driving force transmission gear device to one of a plurality of transmission positions for applying a driving force of said drive source and non-transmission position for not applying the driving force of said drive source.

20. A driving force transmission switching apparatus for optical equipment, comprising:

a driven means;

a single drive source for driving said driven means;
a linear movement driving means which linearly moves away from or meshes with said driven means by a driving force of said drive source, and drives said driven means by the driving force of said drive source when it meshes with said driven means; and
a locking means that allows said driven means to be driven by linear movement of said movement driving means when said movement driving means drives said driven means, while it locks said driven means by retracting said movement driving means when said movement driving means does not drive said driven means.

21. A driving force transmission switching apparatus for an optical apparatus, the driving force transmission apparatus comprising:
a drive source that generates a driving force;
a driving shaft operably connected to the drive source so as to rotate upon the generation of the driving force;
a plurality of driven gears;
a driving gear carrier moveable along the length of the driving shaft between the plurality of driven gears and a fixed non-transmission position; and
a positioning member operable to retain the driving gear member in operable contact with a selected one of the plurality of driven gears or the non-transmission position.

22. The driving force transmission apparatus as in claim 21, wherein the driving shaft is a worm gear.

23. The driving force transmission apparatus as in claim 21, wherein the positioning member comprises a main body having a plurality of position setting portions, and the driving gear carrier includes a position setting portion designed to interact with each of the position setting portions of the main body.

24. The driving force transmission apparatus as in claim 23, wherein the plurality of position setting portions of the main body are recesses and the position setting portion of the driving gear carrier is a complimentary shaped abutment.

25. The driving force transmission apparatus as in claim 23, wherein the plurality of position setting portions of the main body are abutments and the position setting portion of the driving gear carrier is a complimentary shaped recess.

26. The driving force transmission apparatus as in claim 21, further comprising:
at least one locking member, the locking member operable to prevent the rotation of one of the driven gears when the driving gear carrier is not in engagement with the one driven gear, and allow rotation of the one driven gear when the driving gear carrier is in operable contact with the one driven gear.

27. The driving force transmission apparatus as in claim 26, wherein the locking mechanism comprises:
a first lever dimensioned to contact the driving gear carrier as the driving gear carrier is moved into contact with the one driven gear;
a second lever connected to the first lever; and
a spring that normally biases the second lever into contact with the one driven gear so as to prevent rotation of the one driven gear,
wherein, when the first lever contacts the driving gear carrier, the second lever releases the one driven gear so as to allow the one driven gear to rotate.

28. The driving force transmission apparatus as in claim 21, wherein each of the plurality of driven gears operate separate mechanisms of the optical apparatus.

29. A driving force transmission switching apparatus for an optical apparatus, the driving force transmission apparatus comprising:
a drive source that generates a driving force;
a driving shaft operably connected to the drive source so as to rotate upon the generation of the driving force;
a plurality of driven gears which each operate separate mechanisms of the optical apparatus;
a driving gear carrier moveable along the length of the driving shaft between the plurality of driven gears; and
a positioning member operable to retain the driving gear member in operable contact with a selected one of the plurality of driven gears.

30. The driving force transmission apparatus as in claim 29, wherein the driving shaft is a worm gear.

31. The driving force transmission apparatus as in claim 29, wherein the positioning member comprises a main body having a plurality of position setting portions, and the driving gear carrier includes a position setting portion designed to interact with each of the position setting portions of the main body.

32. The driving force transmission apparatus as in claim 31, wherein the plurality of position setting portions of the main body are recesses and the position setting portion of the driving gear carrier is a complimentary shaped abutment.

33. The driving force transmission apparatus as in claim 31, wherein the plurality of position setting portions of the main body are abutments and the position setting portion of the driving gear carrier is a complimentary shaped recess.

34. The driving force transmission apparatus as in claim 29, further comprising:
at least one locking member, the locking member operable to prevent the rotation of one of the driven gears when the driving gear carrier is not in engagement with the one driven gear, and allow rotation of the one driven gear when the driving gear carrier is in operable contact with the one driven gear.

35. The driving force transmission apparatus as in claim 34, wherein the locking mechanism comprises:
a first lever dimensioned to contact the driving gear carrier as the driving gear carrier is moved into contact with the one driven gear;
a second lever connected to the first lever; and
a spring that normally biases the second lever into contact with the one driven gear so as to prevent rotation of the one driven gear,
wherein, when the first lever contacts the driving gear carrier, the second lever releases the one driven gear so as to allow the one driven gear to rotate.

36. The driving force transmission apparatus as in claim 29, wherein the driving gear carrier is moveable along the length of the driving shaft between the plurality of driven gears and a fixed non-transmission position.

37. A driving force transmission switching apparatus for an optical apparatus, the driving force transmission apparatus comprising:
a drive source that generates a driving force;
a driving shaft operably connected to the drive source so as to rotate upon the generation of the driving force;
a plurality of driven gears;
a driving gear carrier moveable along the length of the driving shaft between each of the plurality of driven gears upon the rotation of the driving shaft in a first direction; and
a positioning member operable to retain the driving gear member in operable contact with a selected one of the plurality of driven gears during rotation of the driving shaft in the first direction.

38. The driving force transmission apparatus as in claim 37, wherein the driving shaft is a worm gear.

39. The driving force transmission apparatus as in claim 37, wherein the positioning member comprises a main body having a plurality of position setting portions, and the driving gear carrier includes a position setting portion designed to interact with each of the position setting portions of the main body.

40. The driving force transmission apparatus as in claim 39, wherein the plurality of position setting portions of the main body are recesses and the position setting portion of the driving gear carrier is a complimentary shaped abutment.

41. The driving force transmission apparatus as in claim 39, wherein the plurality of position setting portions of the main body are abutments and the position setting portion of the driving gear carrier is a complimentary shaped recess.

42. The driving force transmission apparatus as in claim 37, further comprising:
  at least one locking member, the locking member operable to prevent the rotation of one of the driven gears when the driving gear carrier is not in engagement with the one driven gear, and allow rotation of the one driven gear when the driving gear carrier is in operable contact with the one driven gear.

43. The driving force transmission apparatus as in claim 42, wherein the locking mechanism comprises:
  a first lever dimensioned to contact the driving gear carrier as the driving gear carrier is moved into contact with the one driven gear;
  a second lever connected to the first lever; and
  a spring that normally biases the second lever into contact with the one driven gear so as to prevent rotation of the one driven gear,
    wherein, when the first lever contacts the driving gear carrier, the second lever releases the one driven gear so as to allow the one driven gear to rotate.

44. The driving force transmission apparatus as in claim 37, wherein the driving gear carrier is moveable along the length of the driving shaft between the plurality of driven gears and a fixed non-transmission position.

45. The driving force transmission apparatus as in claim 37, wherein each of the plurality of driven gears operate separate mechanisms of the optical apparatus.

* * * * *